United States Patent
Berkman et al.

(10) Patent No.: US 7,280,033 B2
(45) Date of Patent: Oct. 9, 2007

(54) SURFACE WAVE POWER LINE COMMUNICATIONS SYSTEM AND METHOD

(75) Inventors: William H. Berkman, New York, NY (US); David Stanley Yaney, Poolesville, MD (US); James Douglas Mollenkopf, Fairfax, VA (US)

(73) Assignee: Current Technologies, LLC, Germantown, MD (US)

( * ) Notice: Subject to any disclaimer, the term of this patent is extended or adjusted under 35 U.S.C. 154(b) by 251 days.

(21) Appl. No.: 10/967,049

(22) Filed: Oct. 14, 2004

(65) Prior Publication Data

US 2005/0111533 A1    May 26, 2005

Related U.S. Application Data

(60) Provisional application No. 60/511,260, filed on Oct. 15, 2003.

(51) Int. Cl.
*G05B 11/01* (2006.01)
(52) U.S. Cl. ............. 340/310.16; 340/310.11; 340/538; 370/442
(58) Field of Classification Search ......... 340/310.11, 340/538, 310.16, 870.01, 310.18; 370/442 X; 307/3; 365/185.2, 185.22; 375/211, 220; 455/402; 398/16; 367/82; 333/100, 24 R
See application file for complete search history.

(56) References Cited

U.S. PATENT DOCUMENTS

| | | | |
|---|---|---|---|
| 2,921,979 A | * | 1/1960 | Hafner .............. 455/41.2 |
| 3,702,460 A | | 11/1972 | Blose |
| 3,810,096 A | | 5/1974 | Kabat et al. |
| 3,846,638 A | | 11/1974 | Wetherell |
| 4,012,733 A | | 3/1977 | Whyte |
| 4,016,429 A | | 4/1977 | Vercellotti et al. |
| 4,060,735 A | | 11/1977 | Pascucci et al. |
| 4,475,209 A | | 10/1984 | Udren |
| 4,569,045 A | | 2/1986 | Schieble et al. |
| 4,638,298 A | | 1/1987 | Spiro |
| 4,912,553 A | | 3/1990 | Pal et al. |
| 5,929,750 A | | 7/1999 | Brown |

(Continued)

FOREIGN PATENT DOCUMENTS

DE    101 47 918 A1    4/2003

(Continued)

OTHER PUBLICATIONS

"EMETCON Automated Distribution System: Coommunications Guide", *Westinghouse ABB Power T & D Company Technical Manual 42-6001A,.* (Sep. 1989), 1-55.

(Continued)

*Primary Examiner*—Brent A. Swarthout
(74) *Attorney, Agent, or Firm*—Mel Barnes; Capital Legal Group, LLC

(57) ABSTRACT

The present invention provides a system for operating a power line communications system that employs surface wave communications and conducted communications. The system is comprised of a plurality of network elements, which may take the form of repeaters, communication interface devices, backhaul devices, medium voltage transducers, distribution points, aggregation points, and others. In one embodiment, surface waves are communicated over the medium voltage power lines and the conducted communications are communicated via the low voltage power lines to and from customer premises.

21 Claims, 12 Drawing Sheets

U.S. PATENT DOCUMENTS

| | | | |
|---|---|---|---|
| 5,933,071 | A | 8/1999 | Brown |
| 5,977,650 | A | 11/1999 | Rickard et al. |
| 5,982,276 | A | 11/1999 | Stewart |
| 6,037,678 | A | 3/2000 | Rickard |
| 6,040,759 | A * | 3/2000 | Sanderson .................. 725/130 |
| 6,151,330 | A | 11/2000 | Liberman |
| 6,160,795 | A | 12/2000 | Hosemann |
| 6,278,357 | B1 | 8/2001 | Croushore et al. |
| 6,281,784 | B1 | 8/2001 | Redgate et al. |
| 6,282,405 | B1 * | 8/2001 | Brown ......................... 725/79 |
| 6,317,031 | B1 | 11/2001 | Rickard |
| 6,480,510 | B1 | 11/2002 | Binder |
| 6,496,104 | B2 | 12/2002 | Kline |
| 6,854,059 | B2 | 2/2005 | Gardner |
| 6,885,674 | B2 * | 4/2005 | Hunt et al. .................. 370/420 |
| 6,933,835 | B2 * | 8/2005 | Kline .......................... 375/258 |
| 6,950,567 | B2 | 9/2005 | Kline |
| 6,958,680 | B2 | 10/2005 | Kline |
| 6,965,302 | B2 | 11/2005 | Mollenkopf et al. |
| 7,026,917 | B2 * | 4/2006 | Berkman .................... 375/220 |
| 7,042,351 | B2 | 5/2006 | Kline |
| 7,075,414 | B2 * | 7/2006 | Giannini et al. ........ 340/310.11 |
| 7,173,935 | B2 | 2/2007 | Lou et al. |
| 7,173,938 | B1 | 2/2007 | Davidow |
| 2001/0054953 | A1 | 12/2001 | Kline |
| 2002/0002040 | A1 * | 1/2002 | Kline et al. .................. 455/402 |
| 2002/0048368 | A1 | 4/2002 | Gardner |
| 2002/0097953 | A1 | 7/2002 | Kline |
| 2002/0110310 | A1 * | 8/2002 | Kline ........................... 385/15 |
| 2002/0110311 | A1 | 8/2002 | Kline |
| 2002/0121963 | A1 | 9/2002 | Kline |
| 2002/0154000 | A1 * | 10/2002 | Kline .................... 340/310.01 |
| 2003/0067910 | A1 | 4/2003 | Razazian et al. |
| 2003/0103307 | A1 | 6/2003 | Dostert |
| 2003/0129978 | A1 | 7/2003 | Akiyama et al. |
| 2003/0160684 | A1 * | 8/2003 | Cern ..................... 340/310.01 |
| 2003/0169155 | A1 | 9/2003 | Mollenkopf et al. |
| 2003/0184433 | A1 | 10/2003 | Zalitzky et al. |
| 2003/0227373 | A1 | 12/2003 | Lou et al. |
| 2004/0032320 | A1 | 2/2004 | Zalitzky et al. |
| 2004/0037317 | A1 | 2/2004 | Zalitzky et al. |
| 2004/0054425 | A1 | 3/2004 | Elmore |
| 2004/0075535 | A1 | 4/2004 | Propp et al. |
| 2004/0113756 | A1 | 6/2004 | Mollenkopf |
| 2004/0113757 | A1 | 6/2004 | White, II et al. |
| 2004/0160990 | A1 * | 8/2004 | Logvinov et al. ........... 370/509 |
| 2004/0174851 | A1 | 9/2004 | Zalitzky et al. |
| 2004/0223617 | A1 | 11/2004 | Corcoran et al. |
| 2004/0227621 | A1 | 11/2004 | Cope et al. |
| 2004/0227622 | A1 | 11/2004 | Giannini et al. |
| 2004/0233928 | A1 | 11/2004 | Pozsgay |
| 2004/0257731 | A1 | 12/2004 | Legaud |
| 2005/0017825 | A1 | 1/2005 | Hansen |
| 2005/0063422 | A1 | 3/2005 | Lazar et al. |
| 2005/0076148 | A1 | 4/2005 | Chan et al. |
| 2005/0111533 | A1 | 5/2005 | Berkman |
| 2005/0164666 | A1 | 7/2005 | Lang et al. |
| 2005/0194838 | A1 | 9/2005 | Wetmore |
| 2005/0200459 | A1 | 9/2005 | White, II |
| 2005/0212688 | A1 | 9/2005 | Chung |
| 2005/0238107 | A1 | 10/2005 | Yamashita et al. |
| 2005/0258920 | A1 * | 11/2005 | Elmore ........................ 333/240 |
| 2006/0146866 | A1 | 7/2006 | Horvath et al. |

FOREIGN PATENT DOCUMENTS

| | | |
|---|---|---|
| EP | 0 822 721 A2 | 2/1998 |
| EP | 0 822 721 A3 | 2/1998 |
| EP | 0 933 883 A2 | 8/1999 |
| EP | 0 933 883 A3 | 8/1999 |
| EP | 1 075 091 A1 | 2/2001 |
| EP | 1 217 760 A1 | 6/2002 |
| EP | 1 021 866 B1 | 10/2002 |
| EP | 1 251 646 A2 | 10/2002 |
| GB | 2 342 264 A | 4/2000 |
| WO | WO-92/16920 A1 | 10/1992 |
| WO | WO-03/009083 A2 | 1/2003 |
| WO | WO-03/009083 A3 | 1/2003 |
| WO | WO-03/010896 A1 | 2/2003 |

OTHER PUBLICATIONS

"IEEE Guide for Power-Line Carrier Applications, ANSI/IEEE Std 643-1980", *The Institute of Electrical and Electronics Engineers, Inc.*, (1980), 1-80.

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992), 1-11.

"Summary of an IEEE Guide for Power-Line Carrier Applications", *IEEE Transactions on Power Apparatus and Systems*, (Nov./Dec. 1980),2334-2337.

Chen, Y-F, et al., "Baseband Transceiver Design of a 128-Kbps Power-Line Modem for Household Applications", *IEEE Transactions on Power Delivery*, (2002),338-344.

Feduschak, N A., "Waiting in the Wings: Is Powerline Technology Ready to Compete with Cable?", www.cabletoday.com/ic2/archives/0301/0301powerline.htm, (Mar. 2001),1-5.

Gutzwiller, F W., et al., "Homenet: A Control Network for Consumer Applications", *IEEE Transactions on Consumer Electronics*, (Aug. 1983),297-304.

Hasler, E F., et al., "Communication Systems Using Bundle Conductor Overhead Power Lines", *IEEE Transactions on Power Apparatus and Systems*, (Mar./Apr. 1975),344-349.

Lokken, G, et al., "The Proposed Wisconsin Eectric Power Company Load Management System Using Power Line Carrier Over Distribution Lines", *1976 National Telecommunications Conference, IEEE*, (1976),2.2-12.2-3.

Meng, H, et al., "A Transmission Line Model for High-Frequency Power Line Communication Channel", *IEEE*, (2002), 1290-1295.

Naredo, J L., et al., "Design of Power Line Carrier Systems on Multitransposed Delta Transmission Lines", *IEEE Transactions on Power Delivery*, (1991),952-958.

Onunga, J, et al., "Distribution Line Communications Using CSMA Access Control with Priority Acknowledgements", *IEEE Transactions on Power Delivery*, (Apr. 1989),878-886.

Yoshitoshi, M, et al., "Proposed Interface Specifications for Home Bus", *IEEE Transactions on Consumer Electronics*, (Aug. 1986),550-557.

* cited by examiner

SURFACE WAVE POWER LINE COMMUNICATIONS SYSTEM AND METHOD

CROSS REFERENCE TO RELATED APPLICATIONS

This application claims priority under 35 U.S.C. § 119(e) to U.S. Provisional Patent Application Ser. No. 60/511,260 filed Oct. 15, 2003, which is incorporated herein by reference in its entirety.

FIELD OF THE INVENTION

The present invention generally relates to data communications over a power distribution system and more particularly, to a power line communication system employing surface wave communications and conductive communications and method of using the same.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, Internet service providers, and the like.

While the concept may sound simple, there are many challenges to overcome in order to use power lines for data communications. Such lines also. Overhead power lines are not designed to provide high speed data communications and are a relatively high impedance communication medium to conductive transmission frequencies used to carry high speed communications. Conductive communications on overhead power lines also are very susceptible to interference. Additionally, federal regulations limit the amount of radiated energy of a power line communication system, which therefore limits the power of the data signal that can be injected onto power lines.

Power distribution systems include numerous sections, which transmit power at different voltages. The transition from one section to another typically is accomplished with a transformer. The sections of the power distribution system that are connected to the customers premises typically are low voltage (LV) sections having a voltage between 100 volts(V) and 240V, depending on the system. In the United States, the LV section typically is about 120V. The sections of the power distribution system that provide the power to the LV sections are referred to as the medium voltage (MV) sections. The voltage of the MV section is in the range of 1,000V to 100,000V. The transition from the MV section to the LV section of the power distribution system typically is accomplished with a distribution transformer; which converts the higher voltage of the MV section to the lower voltage of the LV section.

Power system transformers are one obstacle to using power distribution lines for conductive data communications. Transformers act as a low-pass filter, passing the low frequency signals (e.g., the 50 or 60 Hz) power signals and impeding the high frequency signals (e.g., frequencies typically used for data communication). As such, power line communication systems face the challenge of communicating the data signals around, or through, the distribution transformers.

Furthermore, up to ten (and sometimes more) customer premises will typically receive power from one distribution transformer via their respective LV power lines. However, all of the customer premises LV power lines typically are electrically connected at the transformer. Consequently, a power line communications system must be able to tolerate the interference produced by many customers. In addition, the power line communication system should provide bus arbitration and router functions for numerous customers who share a LV subnet (i.e., the customer premises that are all electrically connected to the power lines extending from the LV side of the transformer) and a MV power line.

In addition, components of the power line communication system must electrically isolate the MV power signal from the LV power lines and the customer premises. In addition, a communication device of the system should be designed to facilitate bi-directional communication and to be installed without disrupting power to customers. These and other advantages are provided by various embodiments of the present invention.

SUMMARY OF THE INVENTION

The present invention provides a power line communication system employing surface wave communications and conductive communications and method of using the same that is comprised of a plurality of network elements, which may take the form of wave couplers, amplifiers, regenerators, communication interface devices, backhaul devices, aggregation points and others. In one embodiment, surfaces wave communications are used to communicate data on the MV power lines and conductive communications are used to communicate data on the LV power lines to and from the customer premises.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
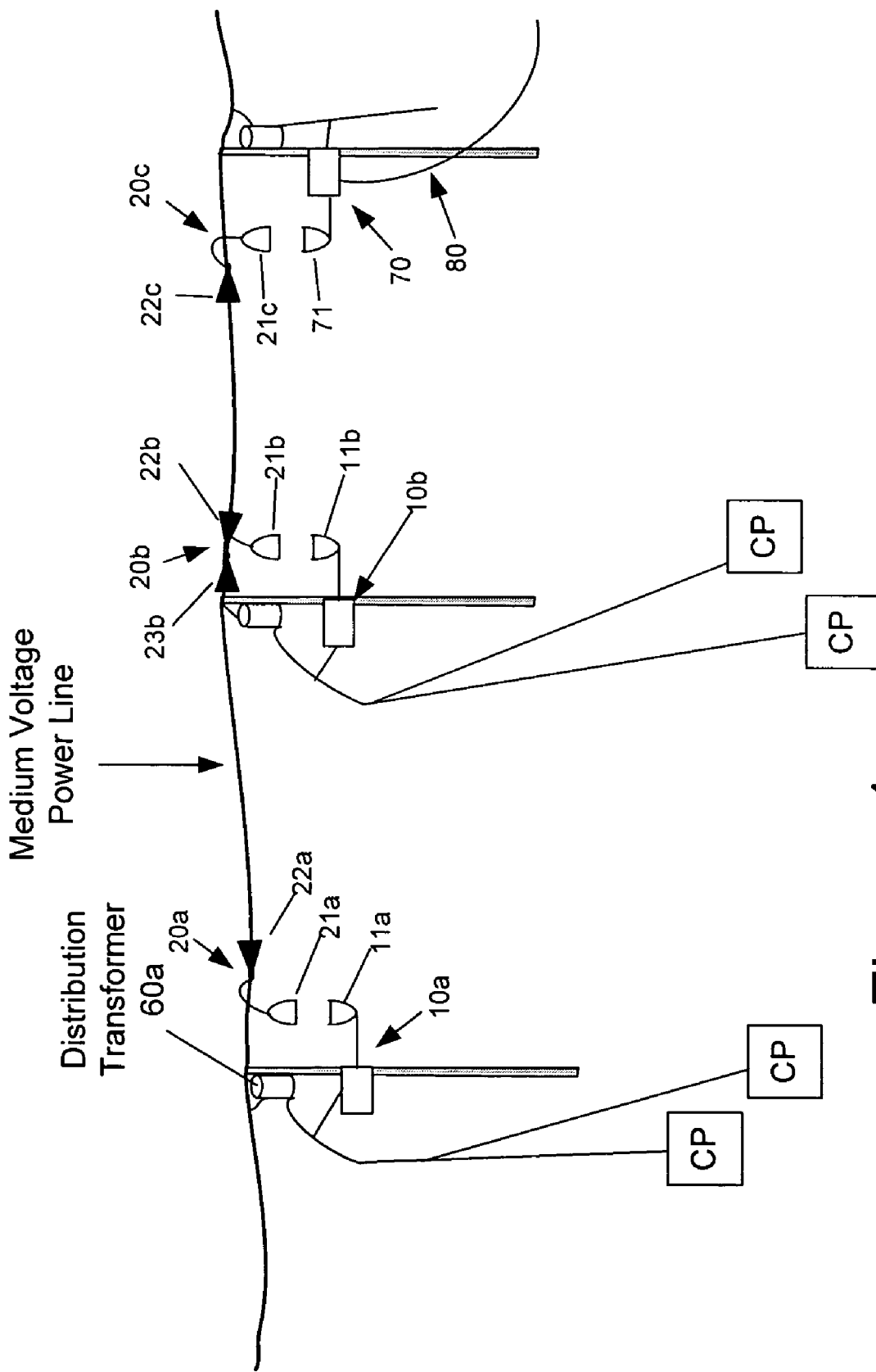
FIG. 1 is a diagram of an exemplary embodiment of the present invention.

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase currents to the customer premises, depending upon the demands of the user.

In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

One embodiment the present invention communicates data to and from communication devices at the customer premises via conductive communications through the LV power lines. In addition, the embodiment may communicate data signals over the MV power line via surface wave communications.

The present invention employs surface waves (otherwise known as GouBau waves) and conductive communications to communicate data signals over power lines, and preferably, to provide broadband communications for data, voice, video, audio, and telephony. Such transmissions may be internet protocol packets in some embodiments. As discussed, power lines provide a relatively high impedance to high frequency conductive transmissions, which means the data signals are attenuated over distance. Because higher frequencies correlate to higher data rates, network designers have had to make a design choice as to whether to design PLC networks for higher data rates or for greater distances. Repeaters have been used to periodically repeat data signals resulting in significant costs.

In contrast, power line surface wave communications do not suffer from the propagation difficulties associated with power line conductive transmissions. Thus, the present invention makes use of surface waves to facilitate high speed communications over the power lines.

Figure 2:
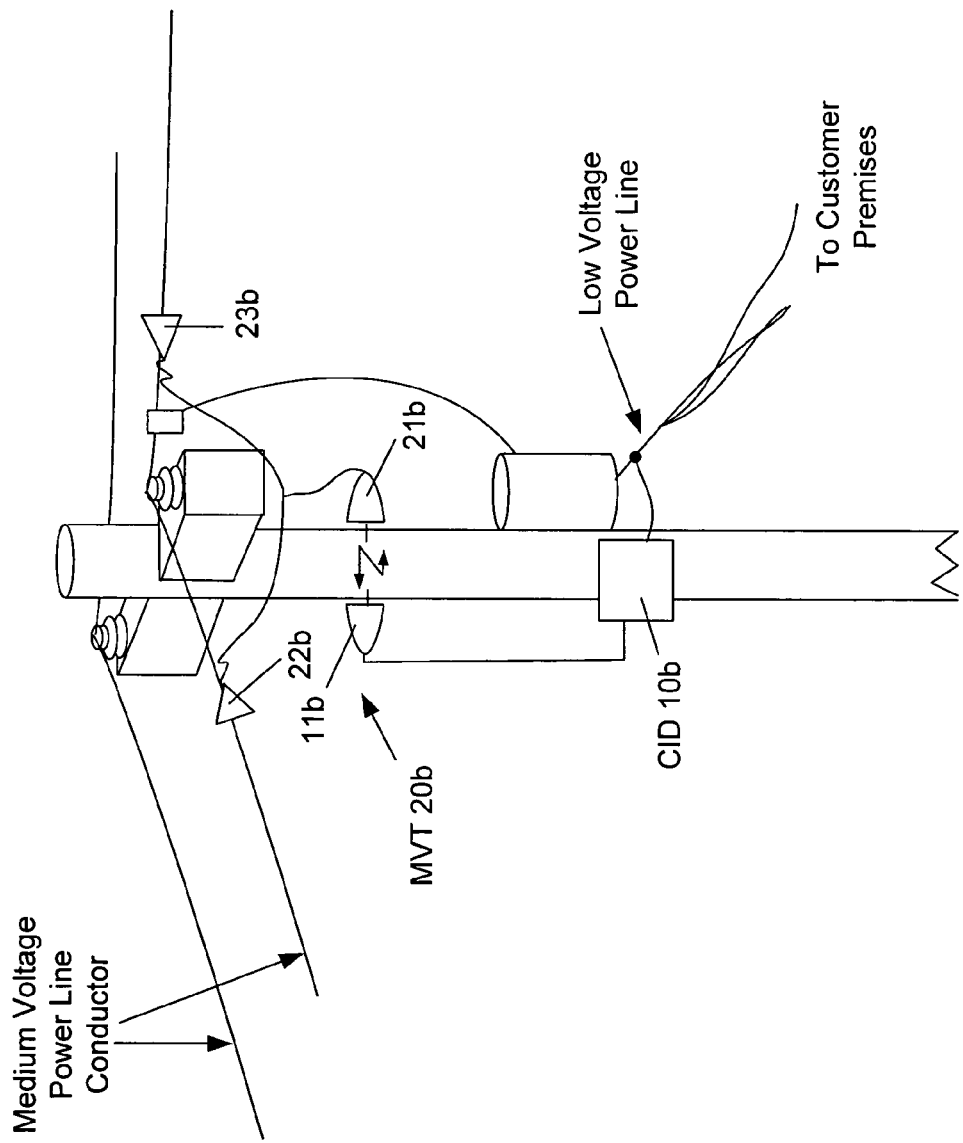
FIG. 2 is a diagram of components of one embodiment of the present invention.

As shown in FIGS. 1 and 2, one example embodiment of the present invention comprises a first communication interface device (CID) 10a that is in communication with a first medium voltage transceiver (MVT) 20a. The first MVT 20a is in communication with a second MVT 20b via surface wave communications over the MV power line. The second MVT 20b is in communication with a second CID 10b.

A CID 10 may include a transceiver and a low voltage interface, which are in communication with each other. As will be described in more detail below, a CID 10 may also include a power supply which receives power from the low voltage power lines via the low voltage interface and supplies power to other functional components of the CID 10.

In this example embodiment, the transceivers of the CIDs 10 are 2.4 GHz transceivers and may also be in communication with a directional parabolic antenna 111a. The low voltage interfaces of the CIDs 10 may be communicatively coupled to the low voltage power lines (external) of the customer premises. While only two customer premises are depicted in FIG. 1, the low voltage interfaces (LVI) of the CIDs 10 may be communicatively coupled to a plurality of customer premises through numerous (e.g., ten or more) low voltage power lines.

The CIDs 10 also may include one or more signal conditioning circuits (e.g., one for the LVI and one for the transceiver) and a controller (e.g., a processor and associated programming), which may perform routing, media access control processing, measuring low voltage power line voltages (e.g., via an A/D converter), bandwidth tiering, user auto provisioning (e.g., assigning and transmitting an address such as an IP address), filtering, receive software updates via the power line, prioritizing certain types of data (e.g., voice over data) and all those functions performed by the controller of the bypass device described in U.S. application Ser. No. 10/641,689 entitled "A Power Line Communication System and Method of Operating the Same," filed Aug. 14, 2003, which hereby incorporated in its entirety by reference.

In this example, the directional parabolic antennas 11 have a three degree beam with a gain of 23 dBi. In essence, the antenna 11 concentrates the power output of the transceiver into a very small area.

The antennas 11 of CIDs 10 are directed towards the antennas 21 of their associated MVTs 20. In this embodiment, antenna 21 also has a three degree beam with a gain of 23 dBi. Antenna 21 is communicatively coupled to a wave communicator 22 via a coaxial cable (or other suitable medium). The wave communicators 22, which may be a dielectric coated metal cone, are fitted around the MV power line. Alternately, the wave communicators may be plastic with metal embedded therein.

MVT 20*b* includes a first wave communicator 22*b* and a second wave communicator 23*b*, and a directional parabolic antenna 21*b* that communicate with each other via a length of coaxial cable. Specifically, wave communicator 23*b* is in bi-directional communication with wave communicator 22*b* and antenna 21*b*. The communication may be accomplished via coaxial cable extending between wave communicators 22*b* and 23*b* with a "T" connector that connects to another coaxial cable which also connects to the antenna 21*b*. Alternately, a first conductor may extend between the first and second wave communicators 22*b*, and 23*b* and a second conductor may extend between the second wave communicator 23*b* and the antenna 21*b*.

CID 10*b* may be comprised of substantially the same components, and operate substantially the same as CID 10*a* as described above.

MVT 20*c* may be comprised of substantially the same components as MVT 20*a*.

Backhaul device 70 is comprised of a directional antenna 71 (substantially similar to antenna 11), a controller (substantially similar to the controller of CID 10 and operable to perform the functions of the backhaul device of the reference incorporated above) and a backhaul transceiver that is communicatively coupled to a backhaul link 80 for communications (direct or indirect) with point of presence, which provides access to the Internet and/or a voice communications provider.

Backhaul transceiver may be a fiber optic transceiver and be communicatively coupled to a fiber optic cable, which may form backhaul link 80 in this embodiment. Alternately, backhaul transceiver may be a wireless transceiver, a coaxial modem, a DSL modem, or other transceiver for communicating through the available communications medium. The backhaul device 70 may include a power supply and be coupled to a low voltage power line to draw power therefrom, and also, but not necessarily, may provide communications to customer premises coupled to those low voltage power lines.

As another alternative backhaul link 80, unidirectional MVT 20*c* may be replaced with a bi-directional MVT such as MVT 20*b*. Thus, the MV power line may provide the backhaul link and the backhaul device 70 may transmit data upstream through its bi-directional MVT via surface waves. The backhaul upstream data signals may be transmitted in the same or a different frequency band (e.g., in the 5 GHz range).

Operation for Downstream Communications

Data received by the backhaul device 70 via the backhaul link 80 may be processed and a representative data signal transmitted to the MVT 20*c* via a wireless 2.4 GHz transmission from antenna 71, which is received by antenna 21*c* and communicated to wave communicator 22*c* (via the coaxial cable). Wave communicator 22*c* communicates the data signal over the MV power line via surface wave transmissions where the data signal is received by wave communicator 22*b* of MVT 20*b*. Wave communicator 22*b* converts the surface wave to a conductive transmission and conductively communicates the data signal to antenna 21*b* via the coaxial cable. Antenna 21*b* communicates the data signal (via a 2.4 GHz wireless transmission) for reception by antenna 11*b* of CID 10*b*. Wave communicator 22*b* also communicates the data signal to wave communicator 22*b*, which transmits the data signal as a surface wave (a 2.4 GHz transmission) over the MV power line for reception by wave communicator 22*a* of MVT 20*a*.

Similarly, wave communicator 22*a* of MVT 20*a* converts the surface wave to a conductive communication and conductively communicates the data signal to antenna 21*a*. Antenna 21*a* transmits the data signal (a 2.4 GHz wireless transmission) for reception by antenna 11*a* of CID 10*a*.

When a CID 10 (e.g., 10*a* or 10*b*) receives data via its associated antenna 11, the CID 10 may perform the processing described in the application incorporated above. Such processing may include, but is not limited to, demodulating, decoding, decryption, and routing. If the address of the data matches the address of a device on the CID's low voltage subnet, the data may then be transmitted via the LVI over the low voltage power lines for reception by the addressed device.

Operation for Upstream Communications

Data received by CID 10*a* via the low voltage power line may be processed (as described in more detail below) and a representative data signal transmitted to the MVT 20*a* via a wireless 2.4 GHz transmission from antenna 11*a*, which is received by antenna 21*a* and conductively communicated to wave communicator 22*a* (via the coaxial cable).

Wave communicator 22*a* communicates the data signal up the MV power line via surface wave transmissions where it is received by wave communicator 23*b* of MVT 20*b*. Wave communicator 23*b* converts the surface wave transmission to a conductive signal and conductively communicates the data signal to wave communicator 22*b* via the coaxial cable. Wave communicator 22*b* converts the conductive signal to a surface wave transmission and communicates the data signal as surface wave transmission (a 2.4 GHz transmission) up the MV power line for reception by wave communicator 22*c* of MVT 20*c*.

Wave communicator 22*c* communicates the data signal to antenna 21*c* which broadcasts the data signal (a 2.4 GHz wireless transmission) for reception by antenna 71 of backhaul device 70. Backhaul device 70 receives the data signal, processes the data signal (e.g., as described below) and may transmit the data through the backhaul link 80 to the destination address.

In an alternate embodiment, in which antenna 21*b* also receives data signals from wave communicator 23*b*, the data signal is transmitted to antenna 11*b* for processing by CID 10*b*. CID 10*b*, however, does not transmit the data over its associated low voltage power lines. For example, the data received may be encrypted with a different encryption key than the key used by CID 10*b*, which would prevent CID 10*b* from decrypting the data. Such data signals would be discarded. Alternately, the router of CID 10*b* may discard the data after determining that the destination address of the data packet does not correspond to a device on its subnet or that the source address of the data packet is not that of the backhaul device 70.

In any of the above embodiments, each CID may be configured to receive data signals in a different frequency range (frequency division multiplexing) and, therefore, each CID 10 may include a band pass filter tuned to a different band than other CIDs. Likewise, each CID 10 may be configured to transmit data signals in a different frequency range (frequency division multiplexing), with the backhaul device 70 transmitting and receiving in each of the bands.

MVT

As will be evident to those skilled in the art from this description, the MVTs 20 of this example embodiment are passive devices that do not require an energy source. Consequently, the description that includes "broadcasting" or "transmitting" is simply meant to convey a direction of communication—either along a power line or to an antenna—and do not necessarily require transmitting by adding energy to the signal.

The medium voltage power line carries power signals that have a voltage component in the thousands of volts (greater than one thousand volts and often greater than five thousand volts). One challenge to using the MV power lines as a communication medium is coupling the data signals to and from the MV power line, while prohibiting the thousand plus volt power signal from being conducted or in other words, isolating the power signal of the MV power line.

As will be evident to those skilled the art, the MVTs described herein are electrically isolated from the other components. In other words, the MVTs are not electrically connected to any other device that is also not electrically to the MV power line (e.g., such as CIDs). Communications between the MVTs and the CIDs is accomplished via a non-conductive communication link—a wireless link in the above example—which provides electrical isolation and permits data communications.

As an alternate embodiment, the non-conductive communication link could be a fiber optic link, a laser link, an inductive link (e.g., a transformer formed by a winding around toroids around an insulated underground distribution cable whose center conductor is coupled to the wave communicator), a capacitive link (e.g., a lightning arrestor), or other suitable link that does not normally conduct the power signal carried by the MV power line.

While the above MVT 20 is a passive device, it may desirable to use a powered MVT, for example, to amplify and transmit the data signals on the MV power line or to communicate data through the non-conductive communication medium to the CID at greater power. However, a MVT that includes a power supply must derive power in a manner that provides isolation of the MV power signal (i.e., does not provide an electrical path for voltages on the MV power line). For example, if the MVT circuit is disposed adjacent the MV power line, it would be unsafe to simply connect a LV power line (and ground) to the MV circuit as the MV power line must be kept in spaced apart relation from grounds and the LV power line.

Thus, the MVT power supply must derive power in a manner that will provide electrical isolation of the MVT. One manner of providing such power would be by employing photocells (solar cells) to derive power from ambient light. Another would be to connect a fiber optic conductor to the MVT photocells and transmit light energy to the MVT power supply. Such a power supply is described in U.S. Ser. No. 10/292,745, entitled "Floating Power Supply and Method of Using the Same," filed Nov. 12, 2002, which is hereby incorporated by reference in its entirety.

In another embodiment, the power supply may employ magnetically permeable toroids (perhaps enclosed in hinged casing) that are fastened around the MV power line. A winding around the toroids provides a second winding of the transformer (the MV power line through the toroids is the first winding) so that power is inductively derived from the power signal carried by the MV power line. The device may include a battery, or a battery back-up (e.g., for when ambient light is insufficient or when the current through the MV power line is too low to provide sufficient inductive power) which is recharged periodically (e.g., during the day in the case of a solar powered MVT or during peak power usage times in the case of an inductively power supply).

Figure 7:
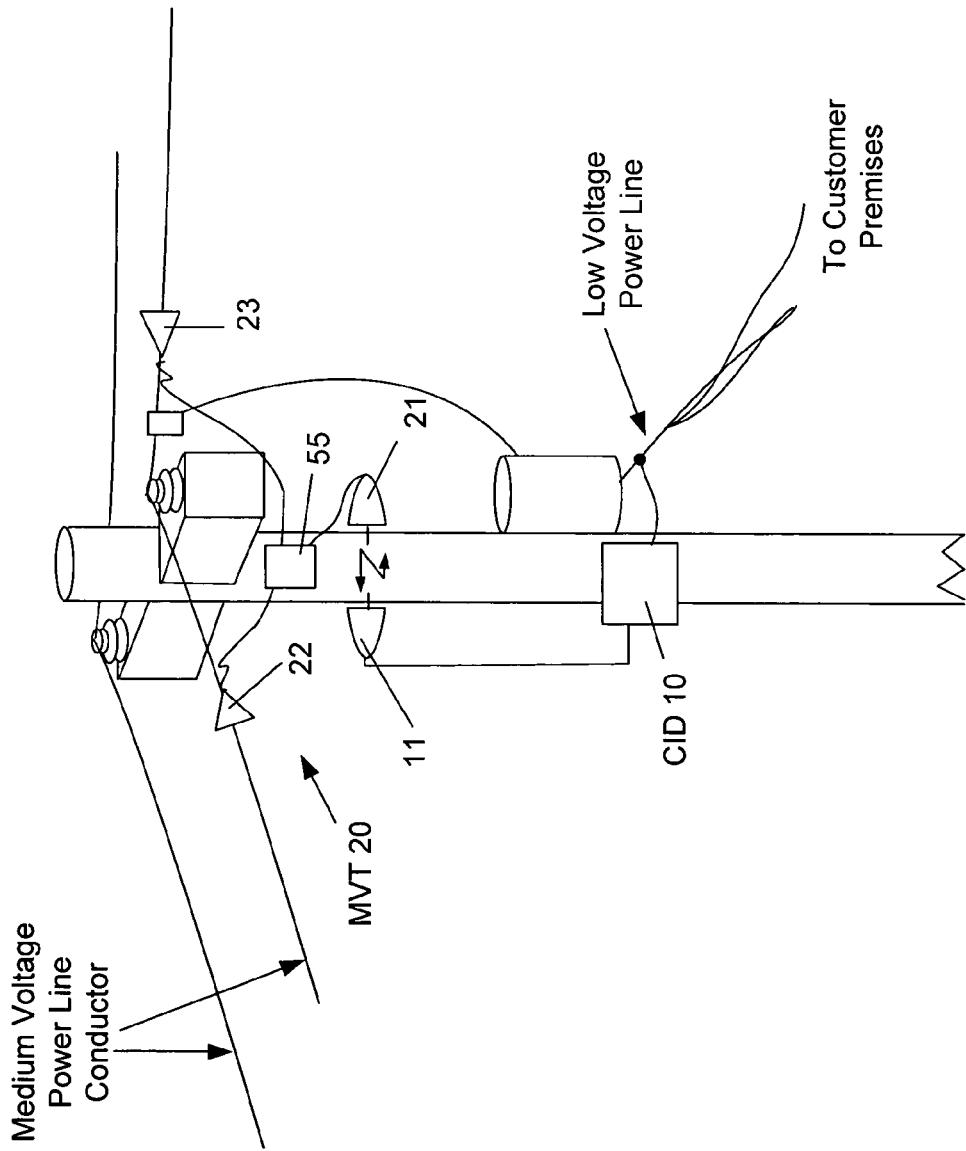
FIG. 7 is a diagram of an example embodiment of a medium voltage transducer of the present invention.

In another embodiment, the CID supplies power through a wireless transmission (either using the same or a second set of antennas) such as 2.4 GHz or 5 GHz transmission, which is received and rectified by the amplifying MVT to amplify the data signals traversing the MV power line and also to wirelessly transmit the data signals to the CID. Such an embodiment is shown in FIG. 7.

In another embodiment, the power supply may receive power transmitted via a Tesla coil.

Wave Coupler

As is known in the art, surface waves tend to travel well along a substantially straight conductor. However, bends can cause signal loss and sharp turns in the conductor can cause significant signal loss. Likewise, objects on and along the power line can disrupt the surface wave transmission resulting in signal loss. One way of managing such signal attenuators is to bypass them.

Figure 8:
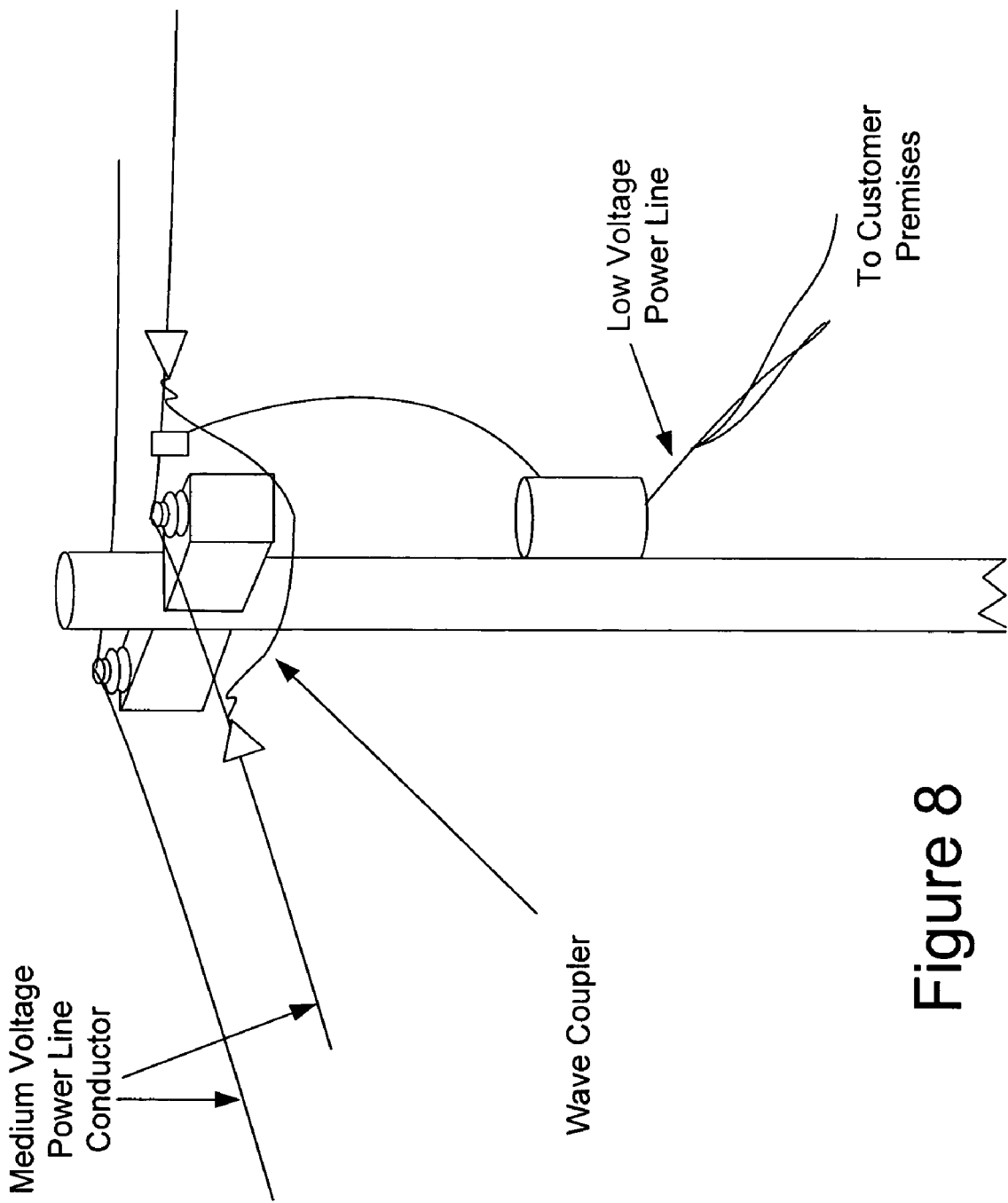
FIG. 8 is a diagram of an example embodiment of a wave coupler of an embodiment of the present invention.

A wave coupler may be comprised a first and second wave communicator coupled together via a coaxial cable. In essence, the wave coupler is comprised of substantially the same components of MVT 20*b* (in FIG. 2), but does not employ an antenna 21*b*. As shown in FIG. 8, a wave coupler allows the surface wave transmission to bypass insulators, bends in the MV conductor at the insulator, and the distribution transformer connection. The wave coupler may also be used to bypass a sharp bend in the power line, a switch, a capacitor bank, and other attenuators. The wave coupler may also be used to communicate the data signal down both branches (which may require a first wave communicator on the main branch and a wave communicator on each branch leg coupled to the main branch wave communicator via coaxial cable).

If not used at a juncture, much of the power of the surface wave signal may tend to travel down the leg that is substantially in alignment with the main branch (and not down the other branch legs). So the wave coupler can be used to more evenly disseminate the power down the desired branch legs. In addition, the wave coupler may be used to couple from one phase conductor to another and to couple from a phase conductor to a neutral conductor.

Amplifier

Figure 3:
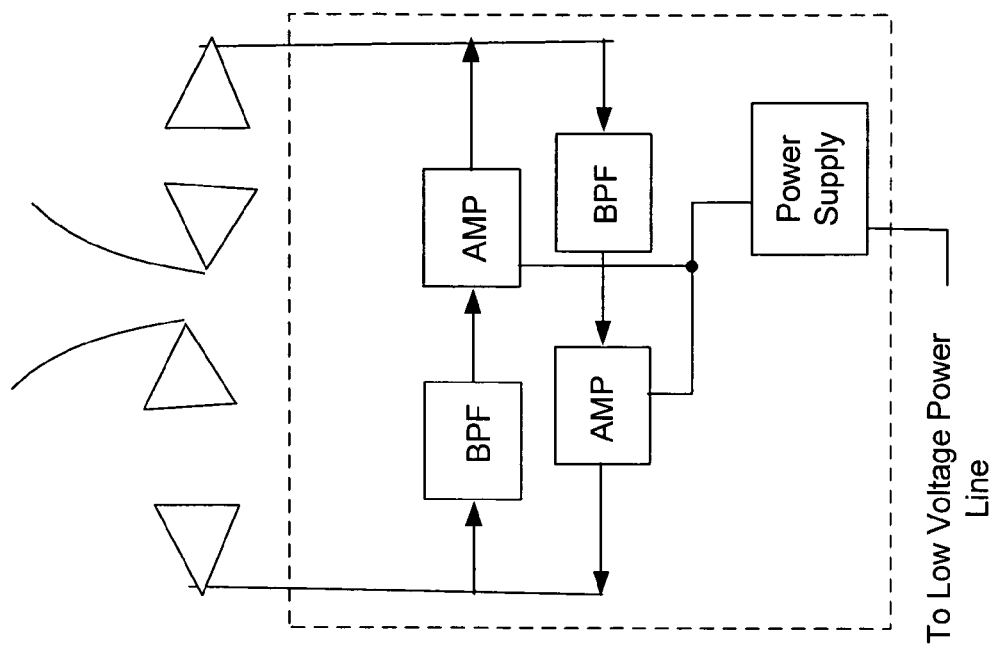
FIG. 3 is a schematic of an embodiment of an amplifier of the present invention.
Figure 3:
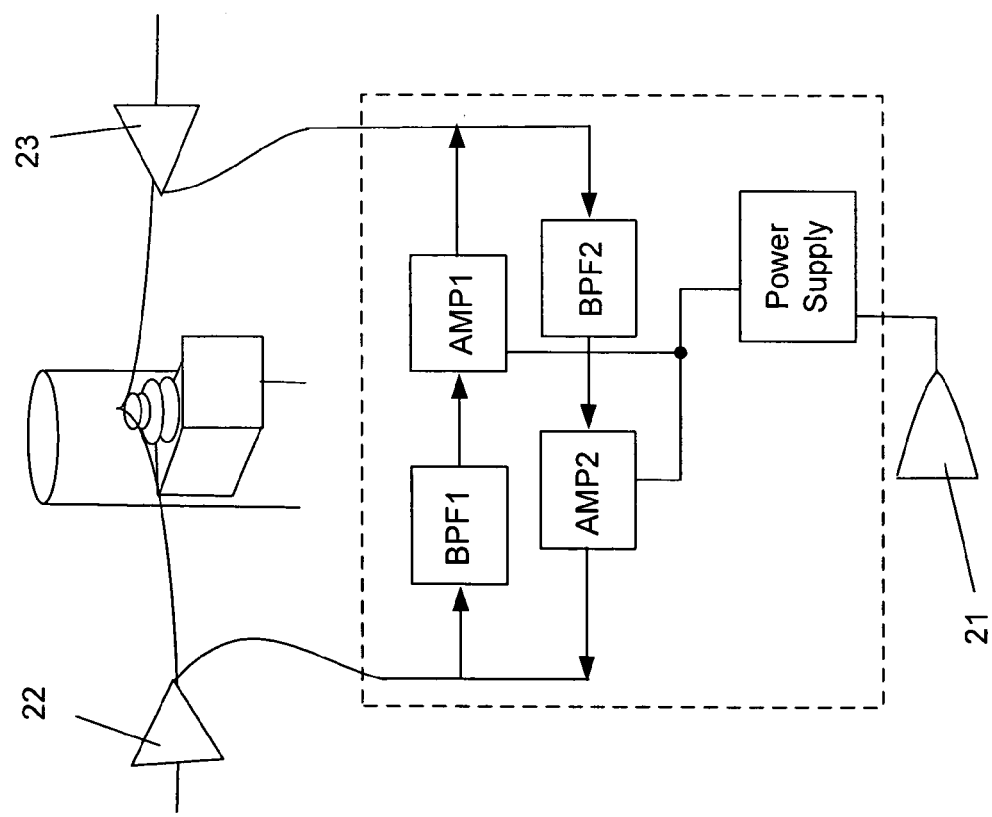

Another system component is the amplifier. FIG. 3*a* illustrates one example embodiment of an amplifier for a frequency division multiplexing PLC system. In this embodiment, upstream data signals are transmitted in a first frequency band and downstream data signals are transmitted in a second frequency band. The amplifier of FIG. 3*a* includes a first wave communicator 22 that receives the data signal and provides it to the first Band Pass Filter (BPF1) for filtering for the upstream data signals. The output of the first BPF1 feeds to an amplifier (AMP1) which amplifies the signal and feeds the amplified signal to the second wave communicator 23 for transmission as a surface wave.

Similarly, the second wave communicator 23 receives downstream data signals (in a different frequency band) and provides them to a second band pass filter BPF2, which filters for the second frequency band. The output of BPF2 is supplied to a second amplifier (AMP2) that supplies the amplified data signal to the first wave communicator 22 for transmission as a surface wave.

The amplifier may designed to receive power in order to amplify the data signals. As shown in FIG. 3a, the power may be transmitted via a wireless link. Alternately, the amplifier may include one or more toroids (e.g., in a hinged enclosure) that fasten around the MV (or LV) power line. A winding through the toroids forms a transformer that inductively draws power from the power line supplying power to a power supply to power the device. The amplifier may be powered by any suitable means that provides the necessary isolation such as those described for the MVT 20 above.

Like wave couplers, amplifiers provide a data bypass around attenuators and therefore may be suitably positioned (although not necessarily so) at the places described for the wave couplers (e.g., around bends, at branches, at insulators, etc.).

As shown in FIG. 3b, the amplifier itself may be isolated from the MV power line and receive the signal to be amplified through an isolation communication link such as a wireless link. After amplification, the signal is wirelessly transmitted to the wave communicators for transmission on the MV power line. In this embodiment, the power may be derived from the LV power line. Also, this embodiment may be integrated into or form part of a CID 10, for example, in a network in which the CIDs are communicatively daisy chained together.

A pulse repeater may also be used to increase the power of the signal. A pulse repeater may improve the signal to noise ratio (in contrast to the amplifier), but does not require demodulation and remodulation of the data signal.

Regenerator

A regenerator filters the signal, demodulates the data signal, modulates the data (in the same or a different frequency band as the received data signal) and then amplifies and transmits the data. Thus, a regenerator may include a first and second modem, which also may include one or more additional functional submodules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional submodules may be omitted in some embodiments, may be integrated into a modem integrated circuit (chip or chip set), or may be peripheral to a modem chip. The regenerator function may be performed by (or integrated into) a CID 10, or backhaul device 70, or a stand alone regenerator device. In one embodiment, the regenerator receives the data signals to be regenerated via a wireless link from an MVT and is powered from a LV power line. The regenerator may be used at locations in the system where the signal-to-noise ration (SNR) needs improvement such that amplification may not suffice to further communicate the signal.

Antennas

As discussed, one embodiment of the present invention employs a wireless link between the MVT 20 and its associated CID 10. This wireless link may cause a certain amount of signal loss as the wireless data signal travels through air. In order to reduce and mitigate this loss, the described embodiment may employ spaced apart directional antennas that are directed toward each other. Consequently, the more accurately the two antennas are aligned, the less the loss of the link.

Figure 4:
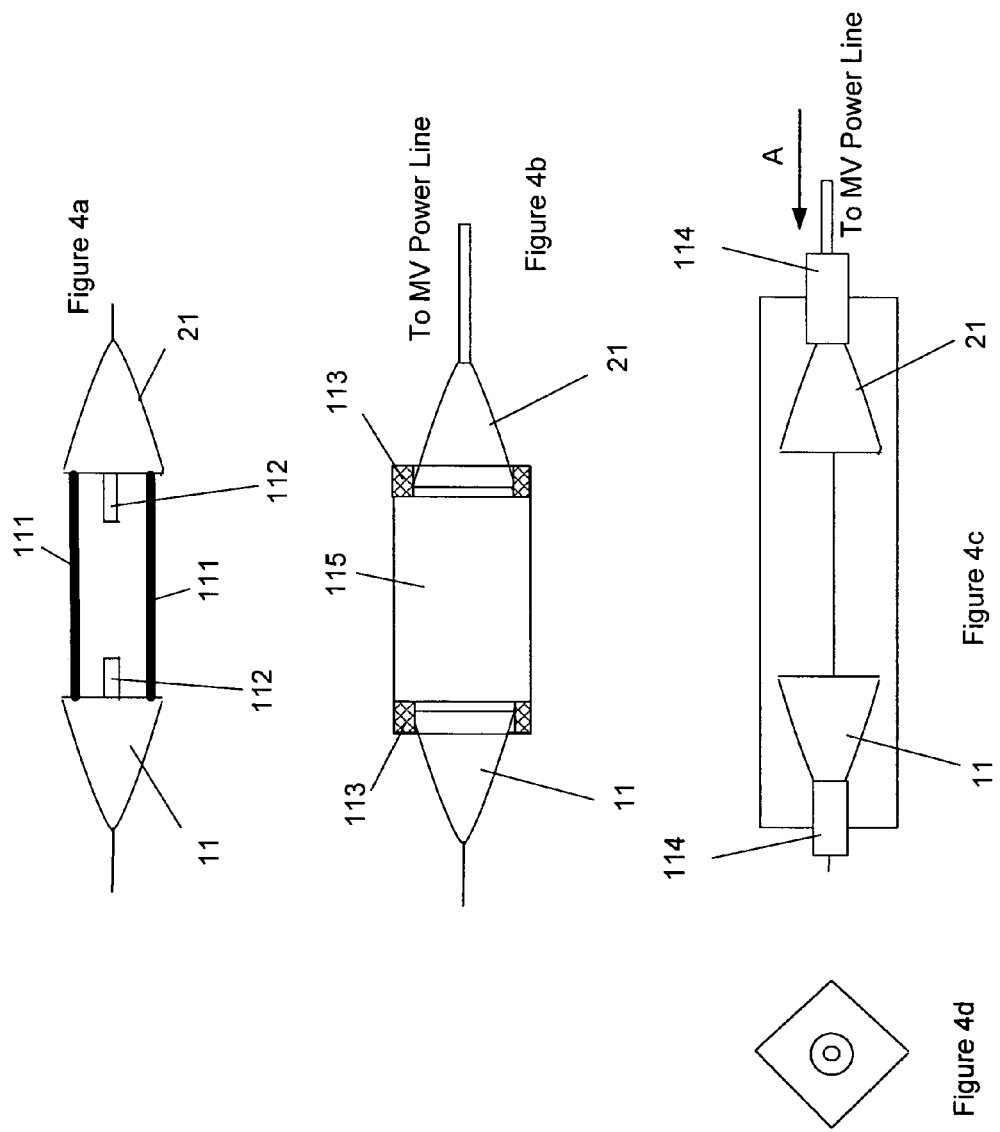
FIG. 4 is a diagram of a number of example antenna configurations in accordance with an embodiment of the present invention.

Each antenna may be attached to the other via a rigid member such as a cylinder. FIG. 4 illustrates a number of antenna configurations. In FIG. 4a, each antenna 11 and 21 is attached to the other via first and second alignment braces 111 to keep the antennas in proper alignment with each other. Additionally, each antenna includes a mounting bracket 112 attached thereto to attach the antennas to the utility pole or other structure.

After the antennas are mounted to the utility pole, the alignment braces 111 may be removed to prevent snow, ice, and water that might come to rest on the braces 111 from creating a conductive path between the two antennas. In some embodiments (or environments), the braces 111 may be designed to prevent a conductive path from forming and the braces 111 may remain attached after installation and during operation.

FIG. 4b illustrates a configuration in which the antennas are coupled to each other via an enclosure, which in this embodiment is a cylinder 115 that keeps the antennas in alignment. The cylinder may be metallic or of another material, which may reflect RF radiation. Alternately, the cylinder 115 may be designed from material to absorb RF radiation, such as a metal or other material coated with an RF absorbing material such as Eccosorb™. These configurations may reduce RF emissions and allow compliance with FCC regulations at greater transmission power. If the cylinder 115 conducts electricity (e.g., is a metal or poor insulator), it may be desirable to insulate the antennas from the inside of the cylinder, such as using insulator 113. Alternately, the cylinder 115 may be non-metallic and employed primarily for alignment of the antennas.

The cylinder may or may not be removed after installation depending on the environment, isolation requirements, the material of the cylinder, the design and purpose of the cylinder, and other factors. If the cylinder or other enclosure includes an apex on the top side and/or the configuration is mounted at a 60 degree angle to prevent a conductive path from forming between the antennas by water, snow, and ice, it may be viable to leave the cylinder in place after installation to keep the antennas in alignment.

FIG. 4c illustrates a configuration in which the antennas are disposed in a dielectric or metal enclosure shaped to have a substantially square cross section. While a dielectric provides a resistance to the passage of electricity, a high enough voltage can pierce through a dielectric. To prevent the flow of electricity through the dielectric or metal enclosure, the cables entering the enclosure are surrounded by an insulator 114. In an alternate embodiment, the antennas also may be insulated from the interior of the enclosure via insulators (such as insulator 113 in FIG. 4b).

In each of these embodiments, the cable(s) may be a conventional coaxial cable, a coaxial underground residential distribution (URD) power line cable (e.g., which may have the outer concentric neutral removed), or other cable. Additionally, these illustrations are merely schematic representations and while the antennas illustrated throughout this description are shown as substantially conical in shape, they may be of any shape, size, or configuration desired.

Also, while the antennas illustrated in the figures are configured horizontally and vertically, they may be tilted to any angle such as a forty-five degrees, sixty degrees, or thirty degree angles, which may to allow debris, rain, water, snow and ice to slide off the outer surface of the antenna.

The disclosed embodiments may employ a 2.4 or 5 GHz wireless link or a wireless link in another frequency range. For example, the wireless link may be at a frequency band of 30-50 MHz. However, FCC regulations provide more severe emission restrictions at these frequencies. Consequently, it may be necessary to employ an antenna enclosure that reduces RF radiation.

Figure 5A:
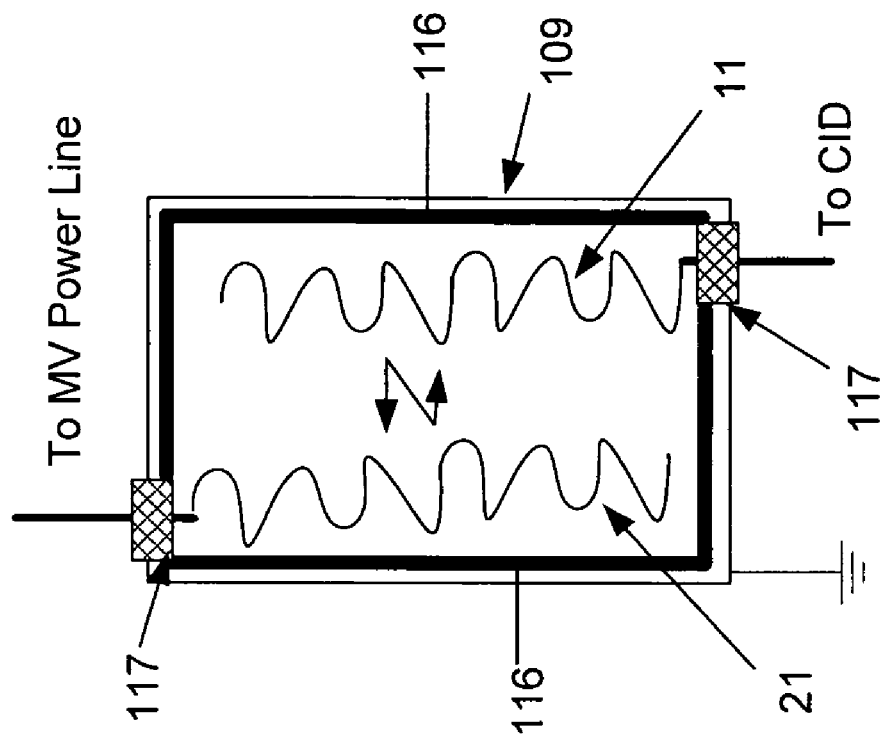
FIG. 5 is a diagram of a number of example antenna configurations in accordance with an embodiment of the present invention.

FIG. 5a illustrates one embodiment of such an enclosure. The enclosure is comprised of a non-metallic container 109, which houses the antennas 11 and 21. The container 109 is lined with a conductive RF absorbing material 116, which are well known in the art. The regions around the cables is lined with a non-conductive RF absorbing material 117 (such as Eccosorb), which, while more expensive than the conductive RF absorbing material, provides electrical isolation between the cable entering the enclosure and the surrounding conductive RF absorbing material 116. Thus, the entire interior of the container 109 is lined with RF absorbing material.

Figure 5B:
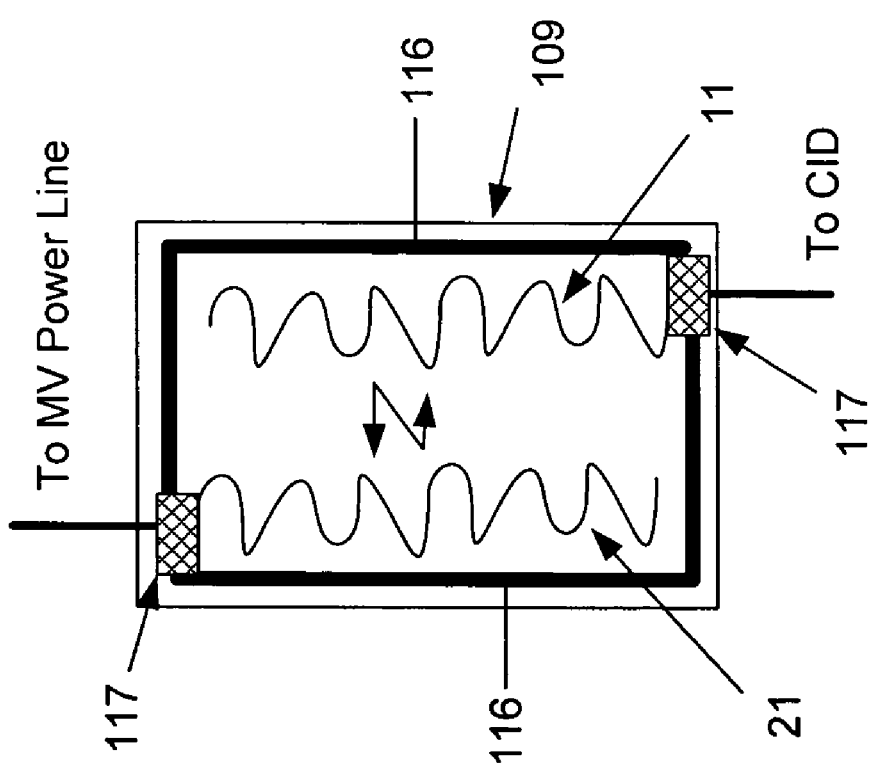

An alternative to this embodiment is shown in FIG. 5b. in which the container 109 is conductive (e.g., metallic), and may be externally coated with an insulator or plastic. As shown in FIG. 5b, the container is grounded. Additionally, the aperture through which the cables entering the container 109 pass is fitted with the non-conductive RF absorbing material 117 (such as Eccosorb) thereby isolating the cables from the metal box. The extraneous RF radiation emitted by the antennas is absorbed by the conductive RF absorbing material 116, conducted to the metal container 109 and grounded (e.g., through a shielded ground conductor). This embodiment may be further altered to remove the by the conductive RF absorbing material 116 so that the metal box simply conducts the radiation to ground. In any of these embodiments, a fuse (such as a cut-out fuse assembly) may be installed serially into the cable (e.g., which may be a URD cable) attached to the MV power line to provide additional safety in case of a fault.

Finally, at the frequencies of this embodiment (the 30-50 MHz range), surface waves may not be practical and the more conventional data signals may be communicated using a power line coupler (as opposed to the above described wave communicator) as described in U.S. Ser. No. 10/348, 164. entitled "Power Line Coupling Device and Method of Using the Same" and filed Jan. 21, 2003, which hereby incorporated in its entirety by reference.

CID Embodiment

Figure 6:
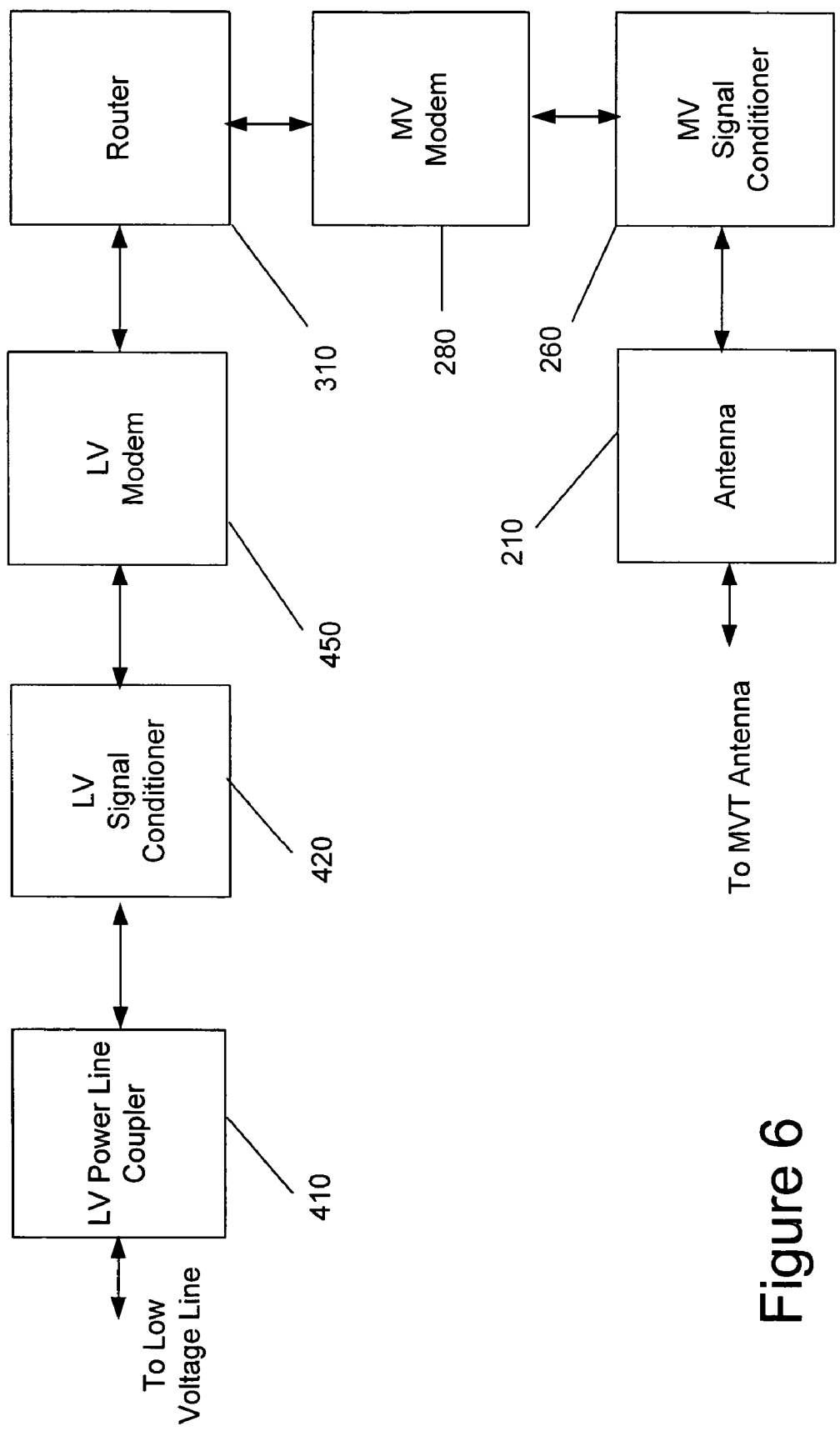
FIG. 6 is a functional block diagram of a portion of a communication interface device, in accordance with an embodiment of the present invention.

As shown in FIG. 6, the CID 10 may include a low volt interface (LVI) that includes a low voltage power line coupler, a low voltage signal conditioner, and a low voltage modem. Additionally, the CID 10 may include a controller that includes a processor and software functioning as a router. A detailed description of these components and their operation is described in U.S. application Ser. No. 10/641, 689 entitled "A Power Line Communication System and Method of Operating the Same," filed Aug. 14, 2003, which was incorporated above. In addition, the CID 10 may include a medium voltage modem, medium voltage signal conditioner and an antenna, which cooperate to communicate over the medium voltage power line (e.g., via surface wave transmissions).

Upstream Data Flow through CID

LV Modem

For upstream data traffic the output of the LV signal conditioner 420 is supplied to the LV modem 450, which includes a modulator and demodulator. The LV modem 450 also may include one or more additional functional submodules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional submodules may be omitted in some embodiments, may be integrated into a modem integrated circuit (chip or chip set), or may be peripheral to a modem chip. In the present example embodiment, the LV modem 450 is formed, at least in part, by part number INT5130, which is an integrated power line transceiver circuit incorporating most of the above-identified submodules, and which is manufactured by Intellon, Inc. of Ocala, Fla.

The incoming signal from the LV signal conditioner is supplied to the ADC to convert the incoming analog signal to a digital signal. The digital signal is then demodulated. The LV modem 450 then provides decryption, source decoding, error decoding, channel decoding, and media access control (MAC) all of which are known in the art and, therefore, not explained in detail here.

With respect to MAC, however, the LV modem 450 may examine information in the packet to determine whether the packet should be ignored or passed to the router 310. For example, the modem 450 may compare the destination MAC address of the packet with the MAC address of the LV modem 450 (which is stored in the memory of the LV modem 450). If there is a match, the LV modem 450 removes the MAC header of the packet and passes the packet to the router 310. If there is not a match, the packet may be ignored.

For downstream data flow, the data is received from the router 310. The LV modem 450 then provides MAC processing, which may comprise adding a MAC header that includes the source MAC address (which may be the MAC address of the LV modem 450) and the destination MAC address (which may be the MAC address of the PLM corresponding to the user device identified by the destination IP address of the packet).

To determine the MAC address of the PLM that provides communications for the user device identified by the destination IP address of the packet, the LV modem 450 first determines if the destination IP address of the packet is an IP address stored in its memory (e.g., stored in its bridging table). If the IP address is stored in memory, the LV modem 450 retrieves the MAC address for communicating with the destination IP address (e.g., the MAC address of the PLM 50) from memory, which will also be stored therein. If the IP address is not stored in memory, the LV modem 450 transmits a request to all the devices to which it is coupled via the low voltage power line (e.g., all the PLIDs). The request is a request for the MAC address for communicating with the destination IP address of the packet. The device (e.g., the PLM) that has the MAC address for communicating with the destination IP address will respond by providing its MAC address. The LV modem 450 stores the received MAC address and the IP address for which the MAC address provides communications in its memory (e.g., in its bridging table). The LV modem 450 then adds the received MAC address as the destination MAC address for the packet.

The packet is then channel encoded, source encoded, error encoded, and encrypted. The data is then modulated and provided to the DAC to convert the digital data to an analog signal Router In the upstream direction of data flow, the data packet from the LV modem 450 may be supplied to the router 310, which forms part of the controller 300. The router 310 performs prioritization, filtering, packet routing, access control, and encryption. The router 310 of this example embodiment of the present invention uses a table (e.g., a routing table) and programmed routing rules stored in memory to determine the next destination of a data packet. The table is a collection of information and may include information relating to which interface (e.g., LVI or MVI) leads to particular groups of addresses (such as the addresses of the user devices connected to the customer LV power lines), priorities for connections to be used, and rules for handling both routine and special cases of traffic (such as voice packets and/or control packets).

The router 310 will detect routing information, such as the destination address (e.g., the destination IP address) and/or other packet information (such as information identifying the packet as voice data), and match that routing information with rules (e.g., address rules) in the table. The rules may indicate that packets in a particular group of addresses should be transmitted in a specific direction such as through the LV power line (e.g., if the packet was received from the MV power line and the destination IP address corresponds to a user device connected to the LV power line), repeated on the MV line (e.g., if the CID 10 is acting as a regenerator), or be ignored (e.g., if the address does not correspond to a user device connected to the LV power line or to the CID 10 itself).

As an example, the table may include information such as the IP addresses (and potentially the MAC addresses) of the user devices on the CID's LV subnet, the MAC addresses of the power line modems on the CID's LV subnet, the MV subnet mask (which may include the MAC address and/or IP address of the CID's backhaul device), and the IP address of the LV modem 450 and MV modem 280. Based on the destination IP address of the packet (e.g., an IP address), the router may pass the packet to the MV modem 280 for transmission on the MV power line. Alternately, if the IP destination address of the packet matches the IP address of the CID 10, the CID 10 may process the packet as a request for data or a command.

In other instances, such as if the user device is not provisioned and registered, the router may prevent packets from being transmitted to any destination other than a DNS server or registration server. In addition, if the user device is not registered, the router 310 may replace any request for a web page received from that user device with a request for a web page on the registration server (the address of which is stored in the memory of the router).

The router 310 may also prioritize transmission of packets. For example, data packets determined to be voice packets may be given higher priority for transmission through the CID than data packets so as to reduce delays and improve the voice connection experienced by the user. Routing and/or prioritization may be based on IP addresses, MAC addresses, subscription level, or a combination thereof (e.g., the MAC address of the power line modem or IP address of the user device).

MV Modem

Similar to the LV modem 450, for upstream data flow the MV modem 280 receives data from the router 310 and includes a modulator and demodulator. In addition, the MV modem 280 also may include one or more additional functional submodules such as an ADC, DAC, memory, source encoder/decoder, error encoder/decoder, channel encoder/decoder, MAC controller, encryption module, and decryption module. These functional submodules may be omitted in some embodiments, may be integrated into a modem integrated circuit (chip or chip set), or may be peripheral to a modem chip. In the present example embodiment, the MV modem 280 is formed of an integrated modem transceiver circuit incorporating most of the identified submodules. In this embodiment, them modem modulates a 2.4 GHz carrier band, but in alternate embodiment could use a 5 GHz carrier band.

The incoming signal from the router 310 (or controller) is supplied to the MV modem 280, which provides MAC processing, for example, by adding a MAC header that includes the MAC address of the MV modem 280 as the source address and the MAC address of the backhaul device 70 (and in particular, the MAC address of the MV modem of the backhaul device) as the destination MAC address. In addition, the MV modem 280 also provides channel encoding, source encoding, error encoding, and encryption. The data is then modulated and provided to the DAC to convert the digital data to an analog signal.

First MV Signal Conditioner

The modulated analog signal from MV modem 280 is provided to the MV signal conditioner 260, which may provide filtering (anti-alias, noise, and/or band pass filtering) and amplification. In addition, in other embodiments the MV signal conditioner 260 may provide frequency translation. Methods of frequency translation are well known in the art and, therefore, not described in detail. The output of the MV Signal conditioner is supplied to the antenna 11 for wireless transmission to the MVT 20.

Downstream Data Flow through CID

MV Modem

In the downstream data flow, upon reception of a data packet, the MV modem 280 of the CID 10 will determine if the destination MAC address of the packet matches the MAC address of the MV modem 280 and, if there is a match, the packet is passed to the router 310. If there is no match, the packet is discarded.

Router

In this embodiment, the router 310 analyzes packets having a destination IP address to determine the destination of the packet which may be a user device or the CID 10 itself. This analysis includes comparing the information in the packet (e.g., a destination IP address) with information stored in memory, which may include the IP addresses of the user devices on the CID 10 LV subnet. If a match is found, the router 310 routes the packet through to the LV modem 450 for transmission on the LV power line. If the destination IP address matches the IP address of the CID 10, the packet is processed as a command or data intended for the CID 10 (e.g., by the Command Processing software described below) and may not be passed to the LV modem 450.

The term "router" is sometimes used to refer to a device that routes data at the IP layer (e.g., using IP addresses). The term "switch" is sometimes used to refer to a device that routes at the MAC layer (e.g., using MAC addresses). Herein, however, the terms "router", "routing", "routing functions" and the like are meant to include both routing at the IP layer and MAC layer. Consequently, the router 310 of the present invention may use MAC addresses instead of, or in addition to, IP addresses to perform routing functions.

For many networks, the MAC address of a network device will be different from the IP address. Transmission Control Protocol (TCP)/IP includes a facility referred to as the Address Resolution Protocol (ARP) that permits the creation of a table that maps IP addresses to MAC addresses. The table is sometimes referred to as the ARP cache. Thus, the router 310 may use the ARP cache or other information stored in memory to determine IP addresses based on MAC addresses (and/or vice versa). In other words, the ARP cache and/or other information may be used with information in the data packet (such as the destination IP address) to determine the routing of a packet (e.g., to determine the MAC address of the power line modem communicating with the user device having the destination IP address).

In an alternate embodiment using IP address to route data packets, all packets received by the MV modem 280 may be supplied to the router 310. The router 310 may determine whether the packet includes a destination IP address that corresponds to a device on the CID's LV subnet (e.g., an address corresponding to a user device address or the CID's address). Specifically, upon determining the destination IP address of an incoming packet, the router 310 may compare the identified destination address with the addresses of the devices on the subnet, which are stored in memory. If there is a match between the destination address and the IP address of a user device stored in memory, the data is routed to the LV power line for transmission to the user device. If there is a match between the destination address and the IP address of the CID 10 stored in memory, the data packet is processed as a command or information destined for the CID 10.

In addition, the router 310 may also compare the destination address with the IP address of the backhaul device, other CIDs, or repeaters (for example, if the CID is also acting as a repeater). If there is no match between the destination address and an IP address stored in memory, the packet is discarded (ignored).

According to any of these router embodiments, if the data is addressed to an address on the CID's LV or MV subnet (the network of devices with which the CID can communicate and/or for which the CID has an address (MAC or IP) stored therein), the router may perform any or all of prioritization, packet routing, access control, filtering, and encryption.

As discussed, the router 310 of this example embodiment of the present invention may use a routing table to determine the destination of a data packet. Based on information in the routing table and possibly elsewhere in memory, the router 310 routes the packets. For example, voice packets may be given higher priority than data packets so as to reduce delays and improve the voice connection experienced by the user. The router 310 supplies data packets intended for transmission along the LV power line to the LV modem 450.

Software

The PLCS also may include a power line server (PLS) that is a computer system with memory for storing a database of information about the PLCS and includes a network element manager (NEM) that monitors and controls the PLCS. The PLS allows network operations personnel to provision users and network equipment (e.g., CIDs), manage customer data, and monitor system status, performance and usage. The PLS may reside at a remote operations center to oversee a group of communication devices via the Internet. The PLS may provide an Internet identity to the network devices by assigning the devices (e.g., user devices, CIDs 10, (e.g., the LV modems and MV modems of CIDs), repeaters/regeneragtors, backhaul devices, and AP) an IP address and storing the IP address and other device identifying information (e.g., the device's location, address, serial number, etc.) in its memory. In addition, the PLS may approve or deny user devices authorization requests, command status reports and measurements from the CIDs, repeaters, and backhaul devices, and provide application software upgrades to the communication devices (e.g., CIDs, backhaul devices, repeaters, and other devices). The PLS, by collecting electric power distribution information and interfacing with utilities' back-end computer systems may provide enhanced distribution services such as automated meter reading, outage detection, load balancing, distribution automation, Volt/Volt-Amp Reactance (Volt/VAr) management, and other similar functions. The PLS also may be connected to one or more APs and/or core routers directly or through the Internet and therefore can communicate with any of the CIDs, repeaters, user devices, and backhaul devices through the respective AP and/or core router.

PLS Command Processing Software

The PLS and CID 100 (or CID also acting as a regenerator) may communicate with each other through two types of communications: 1) PLS Commands and CID responses, and 2) CID Alerts and Alarms. TCP packets are used to communicate commands and responses. The commands typically are initiated by the NEM portion of the PLS. Responses sent by the CID 10 (or repeater) may be in the form of an acknowledgement (ACK) or negative acknowledgement (NACK), or a data response depending on the type of command received by the CID (or repeater).

Commands

The PLS may transmit any number of commands to the CID 10 to support system control of CID functionality. As will be evident to those skilled in the art, most of these commands are equally applicable for repeaters. For ease of discussion, however, the description of the commands will be in the context of a CID only. These commands may include altering configuration information, synchronizing the time of the CID 10 with that of the PLS, controlling measurement intervals (e.g., voltage measurements of an ADC in the CID that is electrically connected to the LV power line), requesting measurement or data statistics, requesting the status of user device activations, and requesting reset or other system-level commands. Any or all of these commands may require a unique response from the CID 10, which is transmitted by the CID 10 (or repeater) and received and stored by the PLS.

Alerts

In addition to commands and responses, the CID 10 (or repeater) has the ability to send Alerts and Alarms to the PLS (the NEM) via User Datagram Protocol (UDP), which does not require an established connection but also does not guarantee message delivery.

Alerts typically are either warnings or informational messages transmitted to the NEM in light of events detected or measured by the CID 10. Alarms typically are error conditions detected by the CID 10. Due to the fact that UDP messages may not be guaranteed to be delivered to the PLS, the CID 10 may repeat Alarms and/or Alerts that are critically important to the operation of the device.

One example of an Alarm is an Out-of-Limit Alarm that indicates that an out-of-limit condition and has been detected at the CID 10, which may indicate a power outage on the LV power line, a temperature measurement inside the CID 10 is too high, and/or other out-of-limit condition. Information of the Out-of-Limit condition, such as the type of condition (e.g., a LV voltage measurement, a CID temperature), the Out-of-Limit threshold exceeded, the time of detection, the amount (e.g., over, under, etc.) the out of limit threshold has been exceeded, is stored in the memory of the CID 10 and may be retrieved by the PLS.

Software Upgrade Handler

The Software Upgrade Handler software may be started by the PLS Command Processing software in response to a PLS command. Information needed to download the upgrade, including for example the remote file name and PLS IP address, may be included in the parameters passed to this software module (or task) from the Software Command Handler.

Upon startup, this task may open a file transfer program such as Trivial File Transfer Protocol (TFTP) to provide a connection to the PLS and request the file. The requested file is then downloaded to the CID 10. For example, the PLS may transmit the upgrade through the Internet, through the backhaul device 70, through the MV power line to the CID where the upgrade may be stored in a local RAM buffer and validated (e.g., error checked) while the CID 10 continues to operate (i.e., continues to communicate packets to and from PLMs and the backhaul device 70). Finally, the task copies the downloaded software into a backup boot page, and transmits an Alert indicating successful installation to the PLS. A separate command transmitted from the PLS, processed by the Command Processing software of the CID 10, may make the newly downloaded and validated program code the primary software operating the CID 10. If an error occurs, the CID 10 issues an Alert indicating the download was not successful.

ADC Scheduler

The ADC Scheduler software, in conjunction with the real-time operating system, creates ADC scheduler tasks to perform ADC sampling according to configurable periods for each sample type. Each sample type corresponds with an ADC channel. The ADC Scheduler software creates a scheduling table in memory with entries for each sampling channel according to default configurations or commands received from the PLS. The table contains timer intervals for the next sample for each ADC channel, which are monitored by the ADC scheduler.

ADC Measurement Software

The ADC Measurement Software, in conjunction with the real-time operating system, creates ADC measurement tasks that are responsible for monitoring and measuring data accessible through the ADC. Each separate measurable parameter may have an ADC measurement task. Each ADC measurement task may have configurable rates for processing, recording, and reporting for example.

An ADC measurement task may wait on a timer (set by the ADC scheduler). When the timer expires the task may retrieve all new ADC samples for that measurement type from the sample buffer, which may be one or more samples. The raw samples are converted into a measurement value. The measurement is given the timestamp of the last ADC sample used to make the measurement. The measurement may require further processing. If the measurement (or processed measurement) exceeds limit values, an alarm condition may be generated. Out of limit Alarms may be transmitted to the PLS and repeated at the report rate until the measurement is back within limits. An out of limit recovery Alert may be generated (and transmitted to the PLS) when the out of limit condition is cleared (i.e., the measured value falls back within limit conditions).

The measurements performed by the ADC, each of which has a corresponding ADC measurement task, may include CID inside temperature, LV power line voltage, and LV power line current (e.g., the voltage across a resistor) for example.

As discussed, the CID 10 includes value limits for most of these measurements stored in memory with which the measured value may be compared. If a measurement is below a lower limit or above an upper limit (or otherwise out of an acceptable range), the CID may transmit an Out-of-Limit Alarm, which is received and stored by the PLS. In some instances, one or more measured values are processed to convert the measured value(s) to a standard or more conventional data value.

The measured data (or measured and processed data) is stored in the memory of the CID. This memory area contains a circular buffer for each ADC measurement and time stamp. The buffers may be read by the PLS Command Processing software task in response to a request for a measurement report. The measurement data may be backed up to flash memory by the flash store task.

The LV power line voltage measurement may be used to provide various information. For example, the measurement may be used to determine a power outage, or measure the power used by a consumer or by all of the consumers connected to that distribution transformer. In addition, it may be used to determine the power quality of the LV power line by measuring and processing the measured values over time to provide frequency, harmonic content, and other power line quality characteristics.

Traffic Monitoring Software

The Traffic Monitoring software may collect various data packet traffic statistics, which may be stored in memory including the amount of data (i.e., packets and/or bytes) communicated (i.e., transmitted and received) through the MV power line, and/or through the LV power line; the amount of data (packets and/or bytes) communicated (transmitted and received) to and/or from the PLS; the number of Alerts and Alarms sent to the PLS; the number of DHCP requests from user devices; the number of failed user device authentications; the number of failed PLS authentications; and the number of packets and bytes received and/or transmitted from/to each user device (or PLM).

Data Filtering Software

The Data Filtering software provides filtering of data packets transmitted to and/or from a user device (or PLM). The filtering criteria may be supplied from the PLS (which may be based on requests received from the user) and is stored in memory of the CID 10 and may form part of the routing table. The Data Filtering software may analyze the data packets and may prevent the transmission of data packets through the CID) that are transmitted to the user device from a particular source (e.g., from a particular person, user, domain name, email address, or IP or MAC source address); 2) that are transmitted from the user device to a particular destination (e.g., to a particular person, email address, user, domain name, or IP or MAC destination address); 3) that have particular content (e.g., voice data or video data); 4) based on the time of transmission or reception (e.g., times of the day and/or days of the week); 5) that surpass a threshold quantity of data (either transmitted, received, or combination thereof) for a predetermined window of time (e.g., a day, week, month, year, or subscription period); or 7) some combination thereof.

Auto-Provision and Activation of Network Components

"Auto-Provisioning" is the term used that may be used to refer to the steps performed to get a new network element (e.g., a CID 10, repeater, or backhaul device) onto the PLCS network. While skilled in working with power lines, personnel installing the CIDs (linemen) often have little or no experience in working with communication networks. Consequently, it is desirable to have a system that permits easy installation of the CIDs without the need to perform network configuration or other network installation procedures.

In the present example embodiment, each network element includes a unique identifier, which may be a serial number. In this embodiment, the enclosure of the CID 10 has a barcode that the installer scans to record the serial number. The installer also records the location of the installed device. This information (the identifying information and location) is provided to a network administrator to input the information into the PLS. Alternately, the installer may wirelessly transmit the information to the PLS for reception and storage by the PLS.

In one example embodiment, after being physically installed and powered up, the CID transmits a request, such as a dynamic host configuration protocol (DHCP) request, to the backhaul device with whom the communication device is physically or functionally connected. In response to the request, the BD assigns and transmits an IP address to the MV interface (i.e., assigns an IP address to be used to communicate with the MV modem 280), and the MV subnet mask. In addition, the BD transmits the IP address of the BD 70 to be used as the CID's network gateway address, and the IP address for the PLS. The CID 10 receives the information from the BD and stores it in its non-volatile memory.

The CID 10 then transmits an Alive Alert to the PLS (using the IP address received in response to the DHCP request) indicating that the CID is running and connected to the network. The Alive Alert may include information identifying the CID, network configurations of the CID (e.g., MAC addresses of the LV modem 450 and MV modem 280), the IP address of the MV Interface (i.e., the IP address assigned to the MV modem 280 received from the BD 70) and MV subnet mask for use by the communication device's backhaul interface (much of which was received from the BD 70). This information is stored by the PLS in the network elements database.

In response, the PLS may activate the CID 10 by assigning and transmitting the CID 10 a LV subnet mask and a LV Interface IP address (i.e., the IP address used to communicate with the LV modem 450). If there are customers present on the LV subnet, the PLS will transmit customer information to the CID 10, which may include such information as data filtering information, keys (e.g., encryption keys), user device IP addresses, and subscription levels for the various users and/or user devices. In addition, the PLS may configure the CID by transmitting DNS addresses (e.g., a first and second DNS address), and a registration server IP address. This information is stored by the PLS (in the network elements database) and the CID 10. As discussed below, until a user device is registered, the CID 10 may be programmed to allow the user device to access only the domain name servers and registration server.

Provisioning a New User Device

Similarly, when a user installs a new user device on the LV subnet attached to the CID 10, the user device may need to be provisioned to identify itself on the network. To do so in this embodiment, the new user device transmits a DHCP request, which is received and routed by the CID 10 to a DHCP server running in the controller 300 of the CID 10. In response to the request, the CID 10 may respond by transmitting to the user device the IP address and subnet mask for the user device, the gateway IP address for the device's network interface to be used as the network gateway (e.g., the IP address of the LV modem 450 of the CID 10), and the IP addresses of the Domain Name Servers (DNS) all of which are stored in memory by the user device. In addition, the CID may transmit a new user device Alert to the PLS.

After provisioning, it may be necessary to register the user device with the network, which may require providing user information (e.g., name, address, phone number, etc.), payment information (e.g., credit card information or power utility account information), and/or other information to the registration server. The registration server may correlate this information with information of the utility company or Internet service provider. The registration server may form part of, or be separate from, the PLS. Until registered, the CID 10 prevents the user device (through its PLM) from communicating with (receiving data from or transmitting data to) any computer other than the registration server or the two DNSs. Thus, until the user device is registered, the CID 10 may filter data packets transmitted to and/or from the user device that are not from or to the registration server or a DNS. In addition, requests (such as HTTP requests) for other Internet web pages may be redirected and transmitted as a request for the registration web page on the registration server, which responds by transmitting the registration web page. Control of access of the user device may be performed by limiting access based on the IP address of the user device to the IP addresses of the registration server and DNSs.

After registration is successfully completed, the registration server communicates with the PLS to provide registration information of the user device to the PLS. The PLS transmits an activation message for the user device (or PLM) to the BD. In response, the CID 10 removes communication restrictions and permits the user device (and PLM) to communicate through the PLCS to all parts of the Internet. As will be evident to those skilled in the art, filtering of data and controlling access of the user device may be performed by limiting access based on the IP address of the user device (or depending on the network communication protocol, the MAC address of the user device) or the MAC address of the PLM to which the user device is connected. Thus, the CID 10 may compare the source IP address (or MAC address) with information in its memory to determine if the IP address (or MAC address) is an address that has been granted access to the PLCS. If the source address is not an address that has been granted access to the PLCS (e.g., by registering, which results in an activation message from the PLS to the CID 10), the CID 10 may replace the destination IP address of the packet with the IP address of the registration server and transmit the packet to the backhaul device. The procedure above, or portions of the procedure, with respect to provisioning user devices may be used to provision a PLID instead of or in addition to a user device.

Backhaul Device

As discussed, the present invention also may employ a backhaul device 70. The backhaul device 70 may comprise a controller, a MV interface, and a network interface. Thus, the MV interface of the device would be much the same as that described in the context of the CID 100 and may include an antenna, a MV signal conditioner, sand a MV modem.

The controller may include a router coupled to the network interface. The network interface may include a network modem, a signal conditioner adapted to condition signals for communication through the network connected to the backhaul device, which may be a wired connection. In addition to or instead of a wired connection, the backhaul device 70 may include a transceiver such as a wireless transceiver for communicating with the AP wirelessly (e.g., an 802.11 wireless link) or a fiber optic transceiver for communicating with the AP via a fiber optic cable. In addition, the controller of this embodiment may include substantially the same software and functionality as that described with respect to the CID 100 and modifications thereto would be readily apparent to one skilled in the art. Specifically, the backhaul device may include substantially the same functionality with respect to monitoring data, taking measurements (e.g., temperature measurement), receiving and invoking software upgrades, transmitting data to the PLS, processing PLS commands (e.g., resets), and transmitting Alerts and Alarms.

Alternate Embodiments

As discussed, the CID 10 of the above embodiment communicates data signals to user devices via the LV power line. Rather than communicating data signals to the PLM and/or user devices via the LV power line, the CID 10 may use another communication medium. For example, the CID may convert the data signals to a format for communication via a telephone line, fiber optic, cable, or coaxial cable line. Such communication may be implemented in a similar fashion to the communication with LV power line as would be well known to those skilled in the art.

In addition, the CID (or MVT) may convert the data signal to radio signals for communication over a wireless communication link to the user device at the customer premises. In this case, user device may be coupled to a radio transceiver for communicating through the wireless communication link. The wireless communication link may be a wireless local area network implementing a network protocol in accordance with an IEEE 802.11 (e.g., a, b, or g) standard.

Alternatively, the CID 10 may communicate with the user device via a fiber optic link. In this alternative embodiment, the CID 10 may convert the data signals to light signals for communication over the fiber optic link. In this embodiment, the customer premises may have a fiber optic cable for carrying data signals, rather than using the internal wiring of customer premise.

In an alternate embodiment of the BD 70, the BD 70 may be communicatively coupled to a plurality of MV power lines. For example, the BD 70 may be installed at a location where the MV power lines intersect in a "T". This alternate embodiment may include three MV interfaces with each having its own antenna and MVT. Each MV antenna may be communicatively coupled to one of the branches.

In addition and as discussed above, the BD 70 may have a wireless transceiver for providing a wireless link to the AP (or distribution point as the case may be) and be a wireless BD. The wireless link to the AP (or distribution point) may be a direct wireless link or may include a wireless repeater in the link between the BD and the upstream device. The wireless repeater may be wirelessly coupled to the AP (or distribution point), although the communication link could also be a wired link or fiber optic link as desired.

In addition, the BD 70, in some instances, may also act as a CID 10 serving those customer premises that receive power from the distribution transformer to which the BD 70 is coupled. Thus, a BD 70 may act as a backhaul device to the other CIDs that are communicatively coupled to the MV power line. However, this BD 70 also is perceived as a CID 10 to the user devices of the LV power lines to which the BD is communicatively coupled. Likewise, a wired BD 70 (that communicates upstream via fiber, coaxial cable, or via another wired means) also may service customers via the LV power lines (or wirelessly). In addition, a wireless repeater upstream from the BD 70 may have a wired (or fiber optic) link to the AP (or DP) instead of a wireless link and communicate with only the BD wirelessly.

Figure 9:
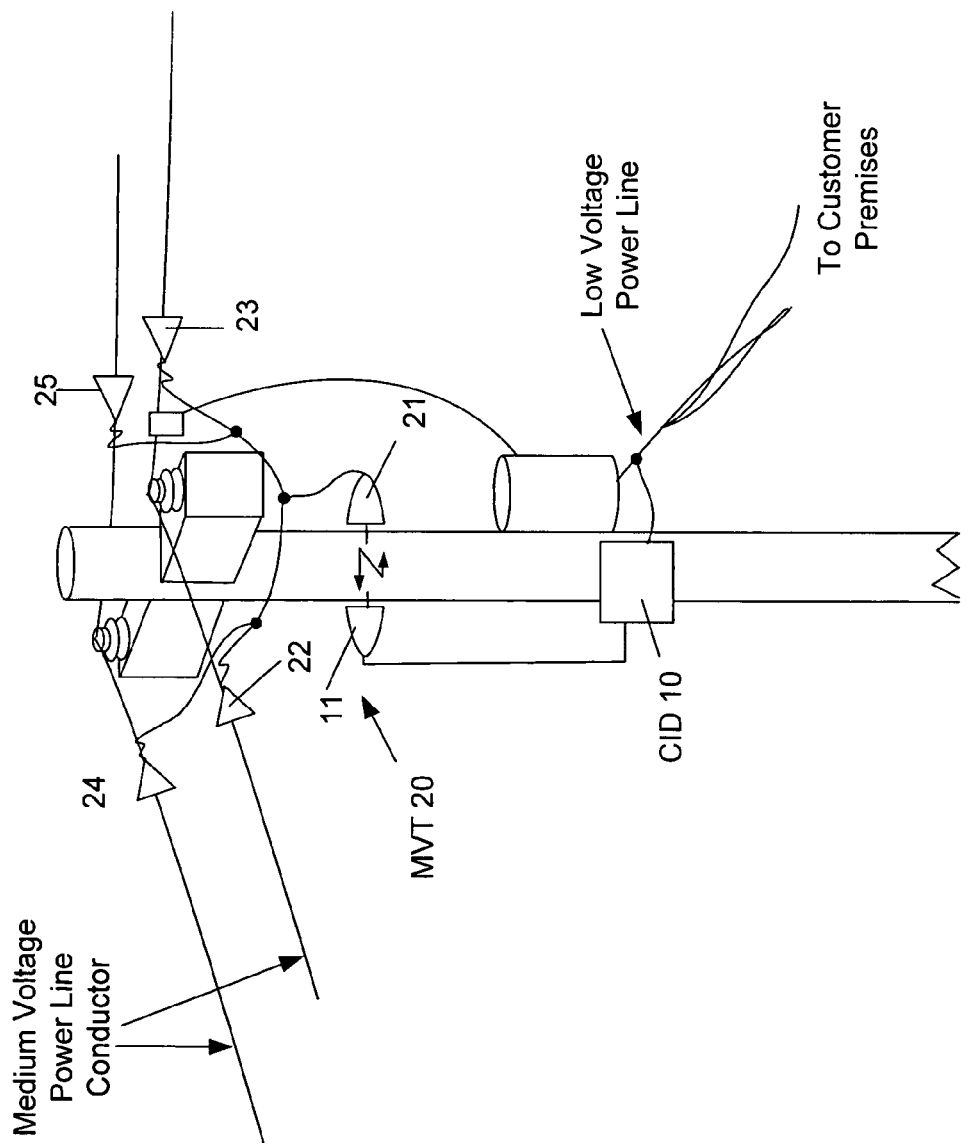
FIG. 9 is a diagram of another example embodiment of a medium voltage transceiver of an embodiment of the present invention.

FIG. 9 illustrates an alternate embodiment of a MVT that includes additional wave communicators. Specifically, this MVT provides communications on multiple conductors, which may be communicated in different frequency bands. While not shown there may be a band pass filter at each wave communicator to permit the passage only of the designated communications (e.g., frequencies) and thereby conserve power. Such filters would prevent an upstream transmission received at wave communicator 24 from being transmitted down the conductor via wave communicator 22. The filters may alternately be disposed in a housing through which communications of all the wave communicators pass.

Also, while the MVT 20 of FIG. 9 is passive, an alternate embodiment could include a power supply (e.g., supplied power from CID 10 via RF transmissions) for amplifying and/or processing (e.g., routing, demodulating/modulating, etc.) communications through the MVT 20.

Figure 10:
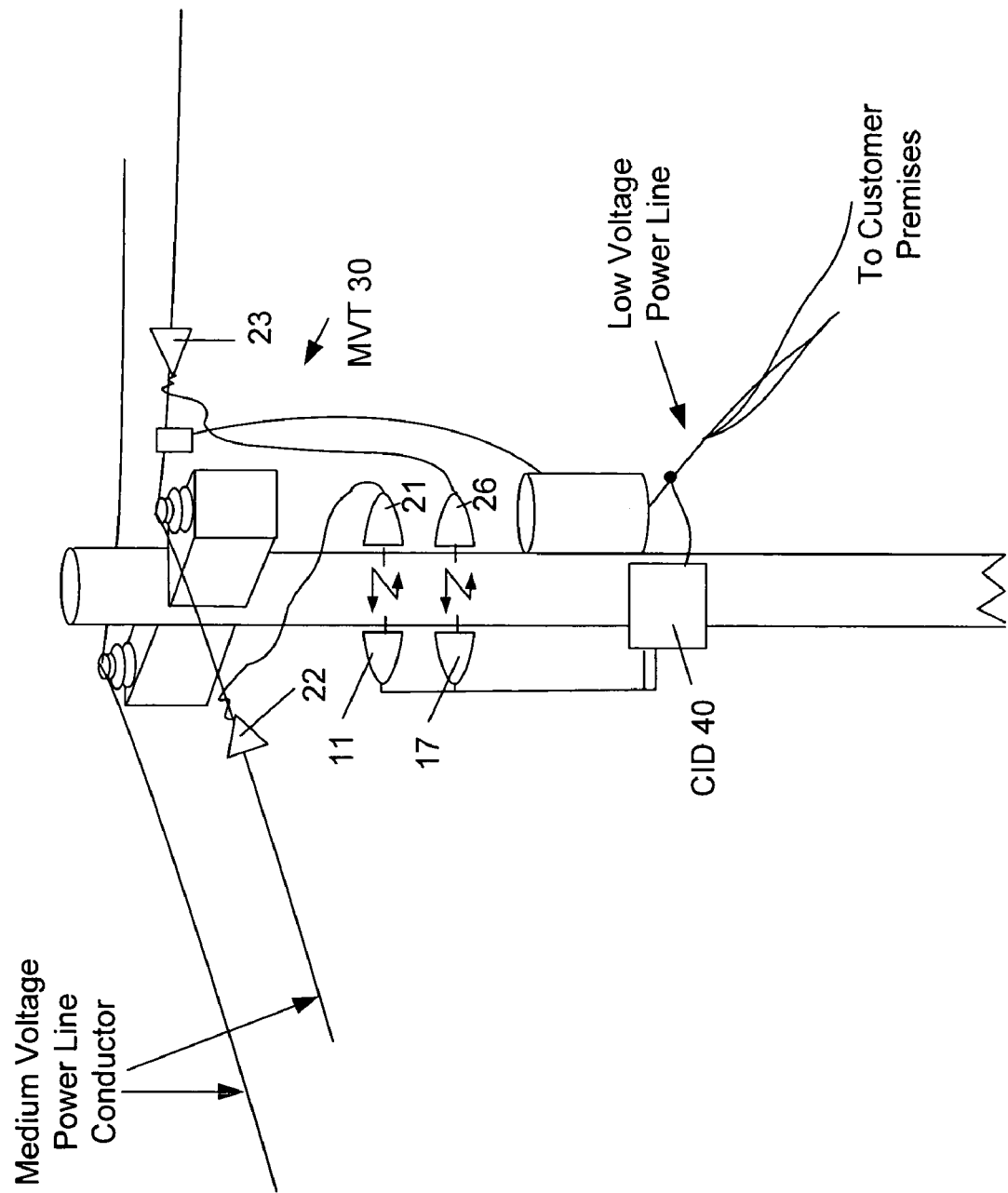
FIG. 10 illustrates another embodiment of a medium voltage transducer and communication interface device, in accordance with another embodiment of the present invention.

FIG. 10 illustrates another embodiment of an MVT and a CID 10. The MVT 30 is comprised of two wave communicators 22, 23, with each being coupled to an antenna 21, 26. The CID 10 in this embodiment includes two antennas 11 and 17.

Communications upstream to the CID 10 (from the left in FIG. 10) traverse through wave communicator 22, the coaxial cable, antenna 21, and antenna 11 to the CID 10. Communications from upstream to the CID 10 (from the right in FIG. 10) traverse through wave communicator 23, the coaxial cable, antenna 26, and antenna 17 to the CID 10. In this embodiment, the CID 10 may include an amplifier or repeater therein to regenerate the data signals (e.g., in the same or different frequency band) for further communications along the MV power line.

Network Topologies

In one embodiment of the present invention, the CIDs may act as regenerators to regenerate the signals for reception by a nearby or the next CID along the MV power line (e.g., a daisy chain configuration). Such as design may be well suited to electrical distribution topologies that have numerous attenuators. In another embodiment, one or more amplifiers and/or wave couplers are disposed between regenerators (which may formed by a CIDs). Thus, the regeneration of the data signals increases the signal to noise ratio.

One backhaul device 70 may communicate over numerous sets of MV power lines to numerous CIDs 10 on each set of MV power lines. Thus, the communications may be point-to-multipoint or daisy chained.

In order to reduce the cost of the network, it is desirable to minimize the number of network elements, such as amplifiers, repeaters, regenerators, which may be required when attenuation of the data signal along the transmission path becomes too great and/or the SNR becomes to low.

Depending on the frequency of transmitted data signals, the distance between the overhead conductors, the size of the conductors, and other facts, the data signals may couple from one phase conductor to another through the ambient air. While there will be some associated loss with such coupling, the network designer can use this coupling effect in designing the network. Thus, the system can be designed to transmit data signals on one conductor and to receive them on one or more other conductors and vice versa.

Figure 11:
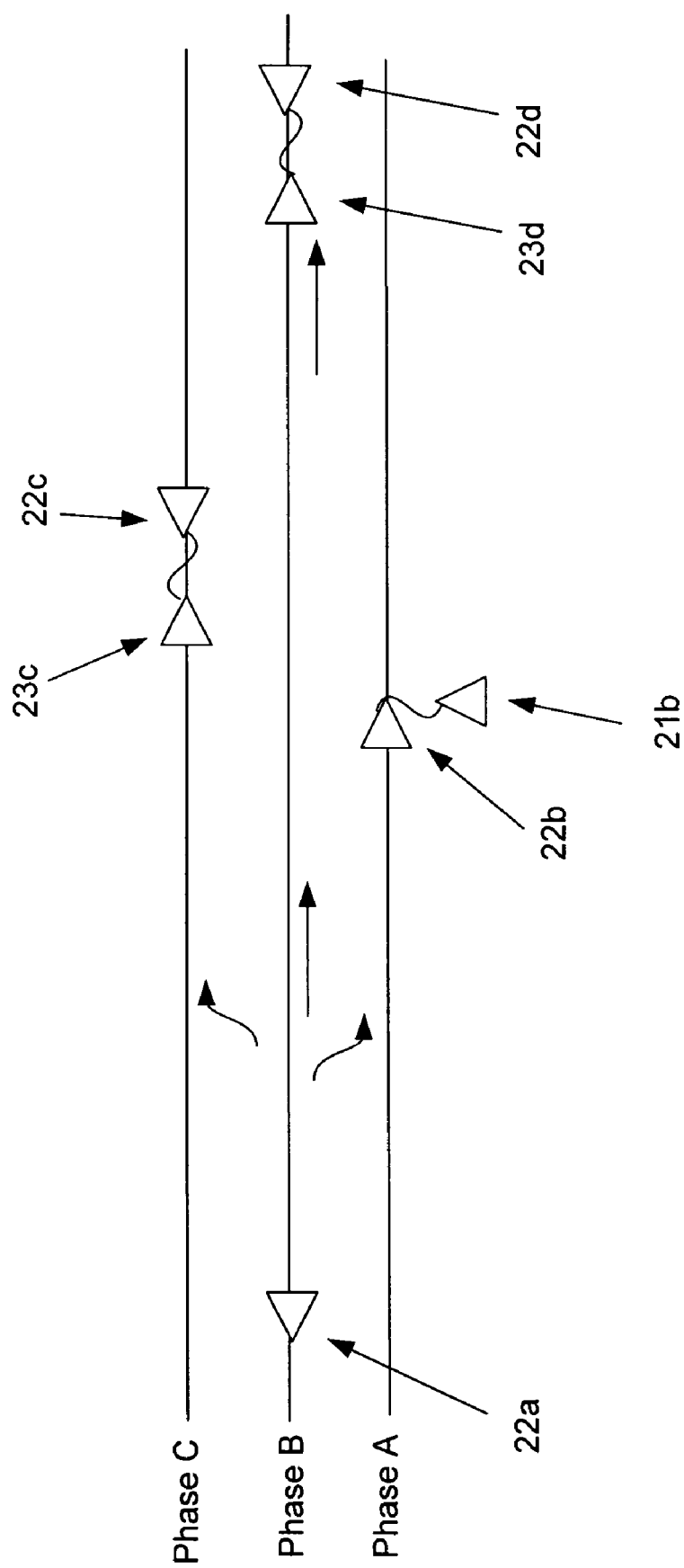
FIG. 11 is a schematic of a portion of a power line communication system in accordance with an embodiment of the present invention.

As will be evident to those skilled in the art, each device on the MV power line—such as the wave communicators—may result in a through loss. And as discussed above, in order to reduce the cost of the network, it is desirable to minimize the number of amplifiers and repeaters. One topology reducing such costs is shown in FIG. 11 in which data signals transmitted by wave communicator 22*a* on phase B coupled through air to phase A and phase C and are received by wave communicators 22*b* and 23*c*, respectively.

Additionally, the data signals are received by wave communicator 23*d*, which is also on phase B. Because wave communicators 22*b* and 23*c* are not on phase B, they do not attenuate data signals between wave communicators 22*a* and 23*d* and therefore do not increase the likelihood that a amplifier or regenerator may be necessary.

Figure 12:
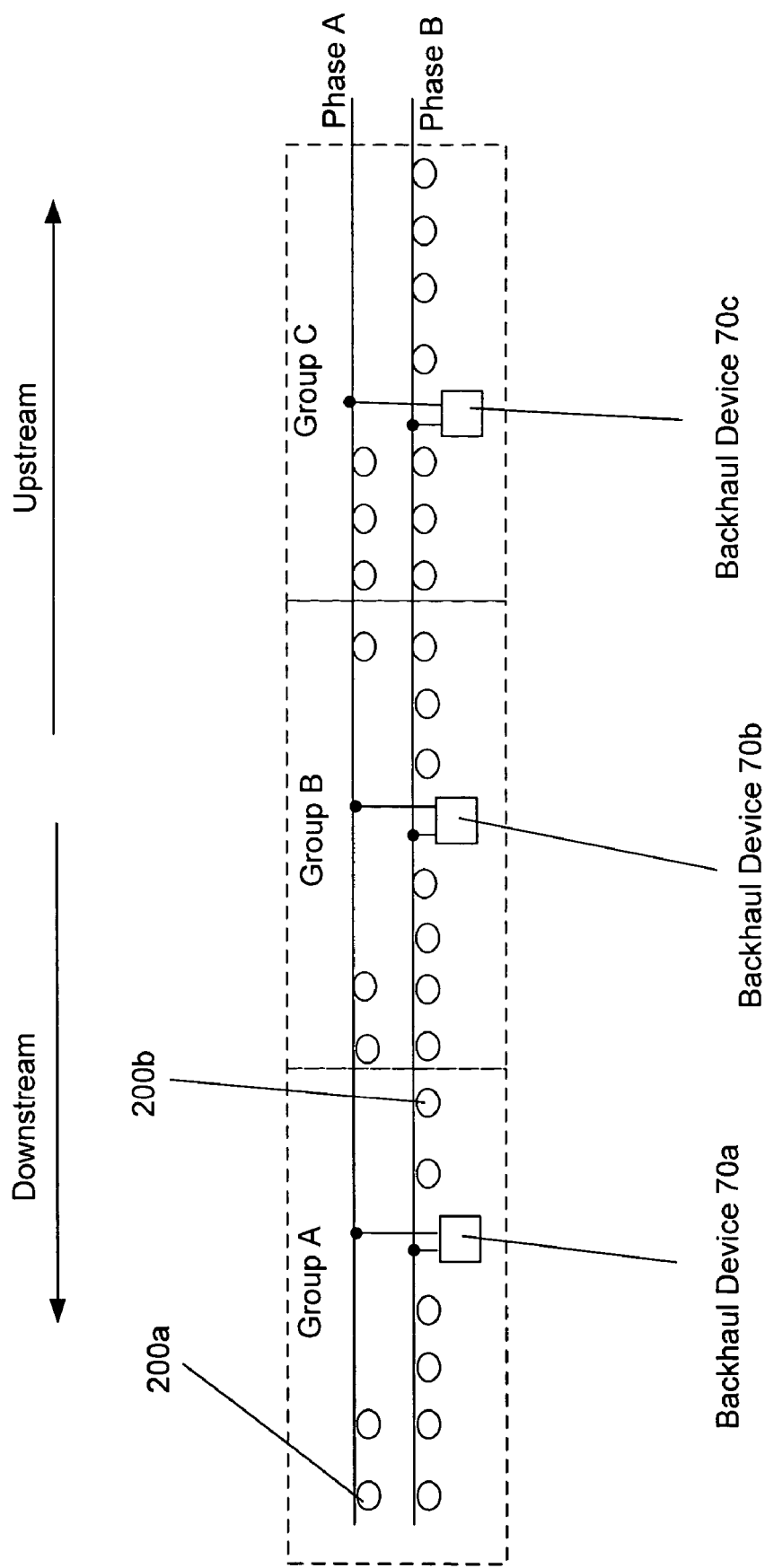
FIG. 12 is a schematic of a portion of a power line communication system in accordance with another embodiment of the present invention.

FIG. 12 is a schematic representation of an example of a network topology employing the present invention. The squares shown in FIG. 12 represent backhaul devices 70 and the circles represent CIDs 10. While not shown in the figure, each CID and each backhaul device also has an associated MVT that allows the device to couple data to and from the MV power line for surface wave communications thereon.

In this embodiment, the CIDs and their respective backhaul device can be logically divided into Groups A, B, and C. The CIDs communicate only with their own backhaul device 70. Said communications may be direct or through amplifiers, regenerators, and/or other CIDs (e.g., either point to point or daisy chained). It may desirable to provide isolation between the groups so that a CID of Group A does cannot communicate with the backhaul device or CIDs of Group B. Consequently, a first group (e.g., Groups A and C) may communicate using a first frequency band (e.g., 2.4 GHz) that is different from a second frequency band (e.g., 5 GHz) used by an adjacent group (e.g., Group B). Alternately, adjacent groups could use different or unique encryption keys to prevent unintended network devices from receiving the data.

In this embodiment, the backhaul devices are daisy chained together and communicate over phase A, which has fewer CIDs 10 installed. Other embodiments, may communicate over a phase that has no CIDs, that has some CIDs that regenerate or amplify the backhaul link data, and may use the neutral conductor as the backhaul link.

Other conductors may also be used to transmit surface waves such as high voltage transmission lines which often travel very straight for long distances. In addition to the above alternate embodiments, the neutral conductor (e.g., the neutral of a MV or HV power line) may used to transmit surface waves. Transmitting over a neutral alleviates the need to provide isolation between the MVT and the CID. Specifically, the CID 10 may be directly coupled to the MVT via a coaxial cable alleviating the need of the antennas 11 and 21. Thus, the CID may be communicatively coupled to first and second wave communicators (that are directed in opposite directions along the conductor) through separate coaxial cables or via a signal cable and T connector that connects both wave communicators. Other conductors, such as twisted pair may also be used to communicate the surface waves (e.g., to supply the backhaul link).

In some instances, it may be desirable to include an isolator on the power line between the two wave communicators to prevent data signals intended for one wave communicator from propagating further along the power line to a second wave communicator. Such an isolator may take the form of a substantially circular material (perhaps conductive) that is sized proportional to the wavelength of the carrier frequency (e.g., having a radius at least ⅛, ¼, ⅓, or ½ of the largest wavelength).

In addition, the CIDs and/or backhaul devices may include system network management protocol (SNMP) capabilities. Also, an overhead power line may be used to communicate surface waves as described herein which is converted to conductive communications for communications through URD power lines (e.g., at a tap). Thus, the overhead surface wave signals may be converted to a conductive signals for communication over the URD power line at the pole riser (or over a coaxial cable extending up the pole) to the network element at the first URD transformer.

While the above embodiments employ a conically shaped wave communicator, any suitable device for receiving and transmitting surface waves may be employed. Throughout this description, the terms "repeater" and "regenerator" are both intended to refer the same type of devices. Where wireless links are discussed herein, such as between a CID and MVT, as the backhaul link, and to the customer premises (e.g., a home or business), any suitable wireless link may be employed including, but not limited to, 802.11 a, b, or g, or 802.16.

Also, the CID may communicate with the customer premises via a conductor (such as a coaxial cable) using an 802.11 communication. Also, the CID 10 may employ a separate modem for upstream and downstream communications or use a single modem for each. In addition, instead of communicating with the CID, the MVT may communicate directly with the customer premises device via a directional antenna disposed at the customer premises. Preferably, this embodiment may employ a powered MVT.

As is known in the art, surface waves generally adhere to conductors better that have a dielectric coating than those that do not. However, overhead power lines typically are not insulated and are not manufactured with a dielectric coating. In order to increase the "adhesion" of the surface wave around a bend, at the apex of the wire at a utility pole, at an insulator, or at another attenuator, the conductor may be coated with a dielectric. The dielectric may be applied via a compressed (or aerosol) spray or via an adhesive (e.g. as in insulating tape). In addition, depending on the surroundings in the trench or conduit, surface waves may be communicated over URD power lines in a manner consistent with that described herein.

While in the above embodiments the communication links between the backhaul device and CIDs are surface wave transmissions, alternate embodiments may also include conductive transmissions. Consequently, the MV power line may be used to transmit convention conductive transmissions and surface wave transmissions simultaneously, thereby creating orthogonal channels. One type of transmission (e.g., conductive) may be used to transmit data between the backhaul point and its CIDs, and the other type of transmission (e.g., surface wave) may be used to daisy chain multiple backhaul devices together and/or used as the backhaul link.

Finally, ultra wide band (UWB) pulses may be used in conjunction with, or instead of, the surface wave and conductive transmissions described herein. For example, UWB pulses may be used to communicate between the CID and the customer premises or to communicate over the backhaul link (e.g., which may be the neutral conductor or an MV phase conductor). Alternately, UWB pulses may be used for communications at sections of the electric power distribution network that include substantial number of attenuators (bends, insulators, etc.) instead of surface wave transmission.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for providing communications for user devices via a medium voltage power line, comprising:
   a backhaul device including a network transceiver and a power line transceiver;
   a first communication assembly including a first medium voltage communication assembly and a first communication device, said first communication device including a first downstream transceiver;
   said first medium voltage communication assembly configured for bi-directional wireless communications with said first communication device and being mounted to the medium voltage power line for communicating surface wave communications over the medium voltage power line;
   wherein said power line transceiver is in communication with said first communication assembly, at least in part, via surface wave transmissions traversing the medium voltage power line; and
   wherein said first downstream transceiver is in communication with at least one user device.

2. The system of claim 1, further comprising:
   a second communication device including a second downstream transceiver
   a second medium voltage communication assembly being mounted to the medium voltage power line and configured for bi-directional wireless communications with said second communication device;
   wherein said power line transceiver is in communication with said second communication device, at least in part, via said second medium voltage communication assembly and surface wave transmissions traversing the power line; and
   wherein said second downstream transceiver is in communication with at least one user device.

3. The system of claim 1, wherein said first downstream transceiver includes a modem configured to communicate over a low voltage power line.

4. The system of claim 1, wherein said network transceiver includes a wireless transceiver.

5. The system of claim 1, wherein said network transceiver includes a fiber optic transceiver.

6. The system of claim 1, wherein said first downstream transceiver includes a wireless transceiver.

7. The system of claim 1, further comprising:
   a second medium voltage communication assembly having a first power line transducer configured to convert transmissions of said power line transceiver to surface wave transmissions; and
   wherein said power line transceiver is in communication with said first communication device via said first and second medium voltage communication assemblies.

8. The system of claim 7, wherein said first medium voltage communication assembly includes a second power line transducer configured to convert wireless transmissions from said first communication device to surface wave transmissions.

9. The system of claim 1, wherein said first communications device includes a router in communication with said downstream transceiver.

10. The system of claim 1, wherein said power line transceiver is in communication with said first communication assembly via internet protocol data packets.

11. The system of claim 1, wherein said power line transceiver communicates voice data.

12. The system of claim 1, wherein said power line transceiver communicates video data.

13. A communications device for providing communications via a medium voltage power line, comprising:
   a downstream transceiver configured to communicate with one or more user devices;
   an upstream transceiver in communication with said downstream transceiver and configured to provide surface wave communications over the power line;
   a power line transducer providing a wireless communication link between said upstream transceiver and the medium voltage power line; and
   said power line transducer comprising a wave communicator configured to communicate surface wave transmissions on the medium voltage power line and an antenna in communication with said wave communicator and configured to wirelessly communicate with said upstream transceiver.

14. The communications device of claim 13, wherein said downstream transceiver includes a modem configured to communicate over a low voltage power line.

15. The communications device of claim 13, wherein said downstream transceiver includes a wireless transceiver.

16. The communications device of claim 13, further comprising a router in communication with said downstream transceiver.

17. A method providing communications over power lines, comprising:
   receiving first data from a user device at a first communications device;
   wirelessly communicating the first data to a first medium voltage power line device of the first communications device;
   transmitting the first data via a first surface wave transmission along a medium voltage power line from the first device;
   receiving the first data of the first surface wave transmission at a second device;
   wirelessly communicating the first data from the medium voltage power line at the second device; and
   transmitting the first data over a backhaul link from the second device.

18. The method of claim 17, further comprising:
   receiving second data at said second device via the backhaul link;
   wirelessly communicating the second data to a second medium voltage power line device of the second device;
   transmitting the second data via a second surface wave transmission along the medium voltage power line from the second device;
   receiving the second data of the second surface transmission at the first device;
   wirelessly communicating the second data from the medium voltage power line at the first device; and
   transmitting the second data to the user device.

19. The method of claim 17, wherein the first data is received at the first device via a wireless transmission.

20. The method of claim 17, wherein the first data is received at the first device via a conductive transmission.

21. The method of claim 17, further comprising routing the first data.

* * * * *